United States Patent [19]

Shirahama et al.

[11] Patent Number: 5,115,386
[45] Date of Patent: May 19, 1992

[54] CIRCUIT FOR CONTROLLING AN ELECTRIC POWER SUPPLY APPARATUS, A METHOD THEREFOR AND AN UNINTERRUPTIBLE POWER SUPPLY

[75] Inventors: Hidefumi Shirahama; Ikuo Yamato; Norikazu Tokunaga, all of Hitachi, Japan; Yasuo Matsuda, Eastchester, N.Y.; Mitsufumi Iwanaka, Hitachi, Japan; Takeshi Nagano, Yokohama, Japan; Youuji Ishida, Hitachi, Japan

[73] Assignees: Hitachi, Ltd., Tokyo; Hitachi Engineering Co., Ltd., Ibaraki, both of Japan

[21] Appl. No.: 597,338

[22] Filed: Oct. 15, 1990

[51] Int. Cl.⁵ .............................. H02M 3/335
[52] U.S. Cl. ........................... 363/41; 363/98; 363/132; 307/66; 307/86
[58] Field of Search ............... 363/17, 41, 97, 98, 363/132; 307/66, 82, 85, 86, 87

[56] References Cited

U.S. PATENT DOCUMENTS

| | | | |
|---|---|---|---|
| 4,615,000 | 9/1986 | Fujii et al. | 363/41 |
| 4,800,478 | 1/1989 | Takahashi | 363/98 |
| 4,803,611 | 2/1989 | Sashida et al. | 363/98 |
| 4,847,743 | 7/1989 | Kamiyama | 363/41 |
| 4,941,075 | 7/1990 | Fox et al. | 363/41 |

Primary Examiner—Peter S. Wong
Attorney, Agent, or Firm—Antonelli, Terry, Stout & Kraus

[57] ABSTRACT

A mathematical model for simulating a dynamic characteristic of an electric power supply apparatus, a model control function for controlling an output from the mathematical model in a closed loop fashion and an electric power supply apparatus control function for approximating a control variable for the electric power supply apparatus to a reference value are provided in a control circuit, wherein an output from the mathematical model is output as a pulse width reference signal, and the pulse width reference signal is corrected by an on-delay portion due to switching elements by means of a gain revision circuit, thereby promptly and stably controlling the electric power supply apparatus.

20 Claims, 26 Drawing Sheets

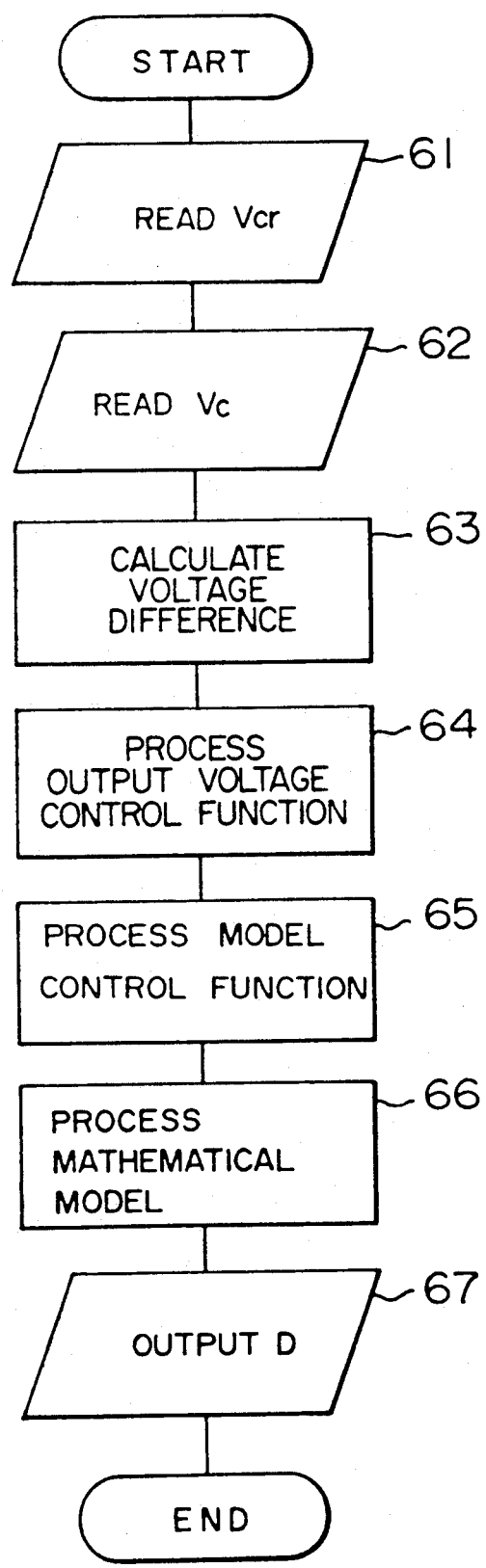

F I G. 30
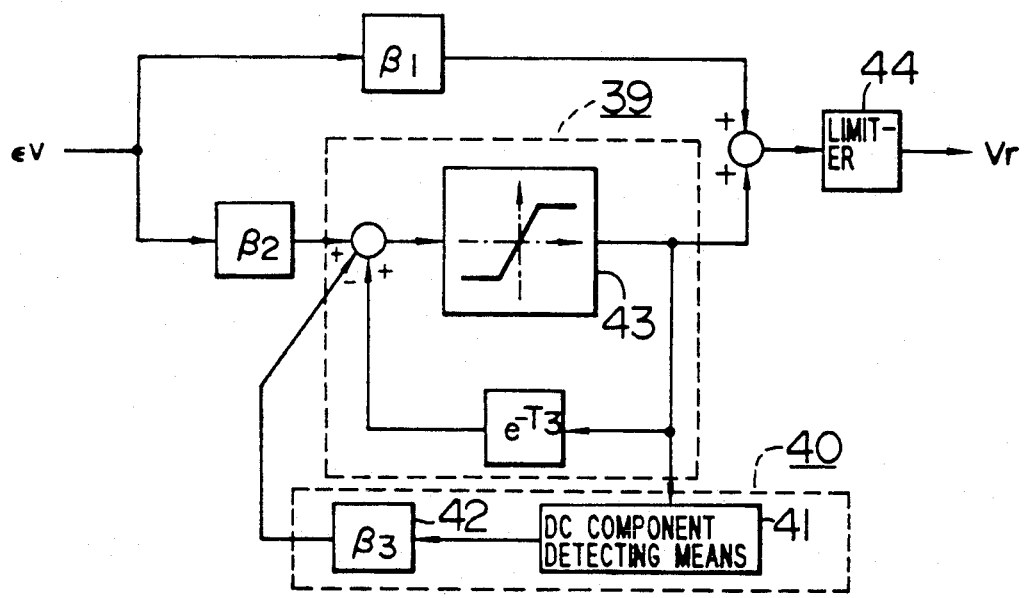

CIRCUIT FOR CONTROLLING AN ELECTRIC POWER SUPPLY APPARATUS, A METHOD THEREFOR AND AN UNINTERRUPTIBLE POWER SUPPLY

BACKGROUND OF THE INVENTION

This invention relates to a control system for an electric power supply apparatus, and more particularly to a circuit for controlling an electric power supply apparatus, a method therefor and an uninterruptible power supply apparatus suitable for use in promptly and stably controlling a controlled variable of an output voltage, an output current, an output power and the like of an electric power supply apparatus.

First, an uninterruptive power supply, which is utilized to prevent troubles from occurring in computers, medical instruments and the like in the event of a power failure, will be explained as an example of a prior art electric power supply apparatus. The uninterruptible power supply is adapted to supply a load such as a computer, a medical instrument and the like with a stable alternating current (AC) electric power, generally from a commercial electric power network, and, in the case of a power failure, from a direct current (DC) electric power generated by a storage battery, and comprises an inverter for converting a DC electric power to an AC electric power and an output filter for removing higher harmonic voltages generated by the inverter from an output voltage waveform.

However, the above-mentioned computer, medical instrument and the like are generally loads having non-linear impedance characteristics, which results in generating distortion in an AC output voltage waveform delivered from the uninterruptible power supply. Also, the AC output voltage may be decreased due to a sudden change of the load. Since such distorted waveform and voltage decrease may cause a malfunction and a trouble of a computer, a high speed control for effectively suppressing a distorted waveform and a voltage decrease in an AC output voltage waveform is now under investigation.

As such high speed control system for an AC output voltage waveform, there are known techniques described in the documents "Materials for 68th Meeting of Power Electronics Society" and "Materials SPC-87-9 for Power Electronics Society (1987)".

These prior art control systems employ a dead beat control and therefore are effective in a high speed control of an AC output voltage waveform. However, as described in the above-mentioned documents, it is necessary for achieving a dead beat control characteristic to compensate for a time delay caused by a processing time required by a processing means employed in a control circuit, a delay caused by a delayed response from a detecting circuit which takes in a controlled variable and the like, thereby making it difficult to build a stable control system.

Further, when a pulse width modulation type inverter is employed in an electric power converting apparatus, such pulse width modulation type inverter generally controls to turn on and off switching elements comprised in the inverter so as to output a voltage having a pulse width in proportion to an output voltage reference value. Also, the on-off control of the switching elements is performed by providing the switching elements with an on-delay for preventing a power supply short.

Such pulse width modulation type inverter generates an unstable output voltage during an on-delay period, which may result in a problem that an output voltage waveform is distorted.

To solve such problem of the pulse width modulation type inverter, there are known techniques, for example, described in "Anthology of Electric Academy Papers" Vol. 107-D, 2, pages 183-190, published in 1987, and the like.

This system prolongs a pulse width modulated signal by a predetermined value when an output current has the positive polarity and reduces the same by a predetermined value when the output current has the negative polarity, to thereby adjust the voltage pulse width to be an essentially necessary width.

When an AC output voltage waveform of an uninterruptible power supply is controlled by the above-mentioned prior art system, it is necessary to control the AC output voltage waveform at a high speed in addition to compensating for influences caused by a delay due to a processing time of a processing means employed in a control circuit, a delay due to a response delay of a detecting circuit which takes in a controlled variable, and the like, thereby making it difficult to fullfil a high speed response control system implementing the above-mentioned dead beat control (finite stabilizing control) and the like susceptible to influence of delay.

Further, a prior art on-delay compensating method for pulse width modulation type inverter is problematic in that when a current flowing into a load of the inverter include a large ripple, a region in which the polarity of the current is reversed exists within a half period of a carrier, so that there exist, in a single carrier period, an on-delay period in which an output current has the positive polarity and another on-delay period in which the output current has the negative polarity. It is therefore impossible to perform a precise on-delay compensation and accordingly improve an output voltage waveform.

SUMMARY OF THE INVENTION

It is an object of the present invention to provide a control system for an electric power supply apparatus which is capable of promptly and stably controlling a controlled variable such as an output voltage, an output current, an output electric power and the like delivered from an electric power supply apparatus such as an uninterruptible power supply and the like.

It is another object of the present invention to provide an uninterruptive power supply employing an electric power converter comprising a pulse width modulation type inverter which is capable of reducing distortion in an output waveform due to an on-delay even with a load which may generate a large current ripple.

The above-mentioned first object is achieved by providing a control circuit with a mathematical model for simulating the behavior of an electric power supply apparatus, a model control function for controlling in a closed loop fashion a controlled variable of the model corresponding to a controlled variable of the electric power supply apparatus, an electric power supply apparatus control function for approximating the controlled variable of the electric power supply apparatus to a reference value, and employing the output of the model control function as a manipulating variable for the electric power supply apparatus as well as for the model and utilizing an output of the electric power supply apparatus control function as a reference value for the model control function.

For an electric power supply apparatus which supplies three-phase AC output voltages, the first object is achieved by providing converting means for equivalently converting detected values of three-phase AC output voltages from the electric power supply apparatus to two-phase AC voltage signals, two mathematical models for simulating dynamic characteristics of respective phases of the output voltages equivalently converted to the two-phase AC voltage signals, two model control functions for controlling in a closed loop fashion two output signals from the two models corresponding to the output voltages from the electric power supply apparatus, and two electric power supply apparatus control functions for manipulating reference values for the respective model control functions for approximating the two-phase AC voltage signal to the reference values, wherein the two outputs of the respective model control functions are utilized as manipulating amounts for the models as well as for the electric power supply apparatus to thereby produce three pulse width references from the two manipulating variables for the electric power supply apparatus.

Next, the second object is achieved by controlling a pulse width correcting variable in proportion to an instantaneous value of a basic wave component of the output current and providing the pulse width correcting variable with an upper limit and a lower limit corresponding to an on-delay time.

Alternatively, the second object is also achieved by controlling a correcting variable for an output voltage reference value in proportion to an instantaneous value of a basic wave component of the output current and providing the correcting variable with an upper limit and a lower limit corresponding to an on-delay time.

The model control function arranged in the control circuit controls the mathematical model in a closed loop fashion. The present invention, by applying such control scheme, can eliminate the necessity of considering a delay due to a processing time of control processing means, a delay due to a response delay of a detecting circuit and the like and accordingly provide a high speed control characteristic.

Further, the present invention varies an ondelay correcting variable according to an instantaneous value of a basic wave component of the output current in a region in which the polarity of the output current is reversed during a half period of a carrier, so that a voltage error in every pulse can be reduced, which results in substantially annihilating the total voltage errors in the region in which the polarity of the output current is reversed during a half period of the carrier.

BRIEF DESCRIPTION OF THE DRAWINGS

FIG. 7 is a processing flowchart;

FIG. 30 is a block diagram illustrating a limiter circuit;

DESCRIPTION OF THE PREFERRED EMBODIMENTS

Embodiments in which the present invention is implemented in an uninterruptible power supply will hereinafter be explained with reference to FIGS. 1 through 33.

Figure 1:
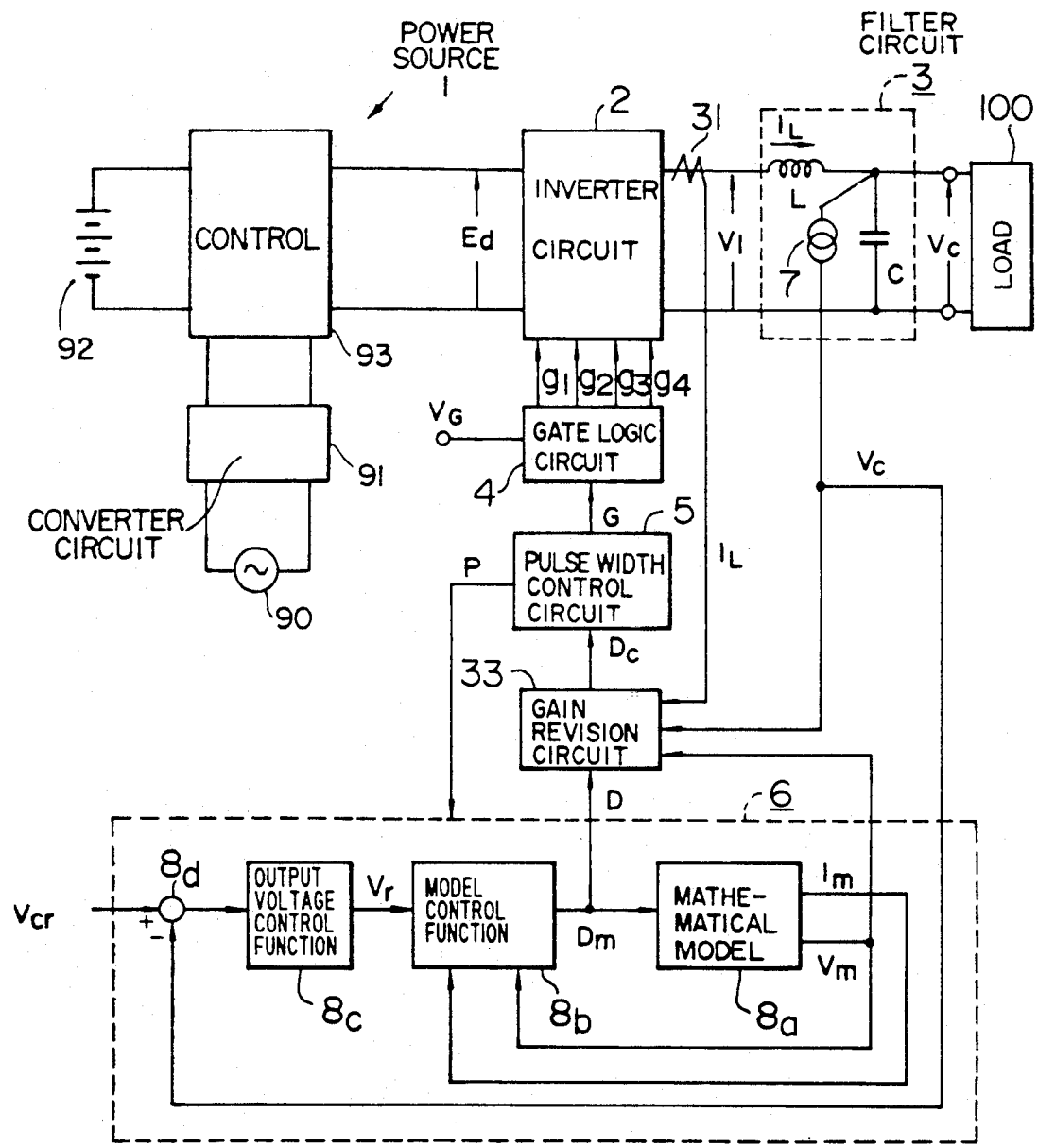
FIG. 1 is a block diagram illustrating a whole arrangement of a first embodiment of the present invention.

FIG. 1 shows a whole arrangement of a first embodiment of the present invention. A main circuit section in FIG. 1 comprises DC power source 1, an inverter circuit 2 for inverting a DC voltage Ed produced by the DC power source 1 to an AC voltage $V_I$ and an output filter 3 for removing higher harmonic components from the inverter output voltage $V_I$ to deliver a smooth AC output voltage Vc which is supplied to a load 100. A control circuit section comprises a gate logic circuit 4 for generating gate pulses $g_1$, $g_2$, $g_3$ and $g_4$ for driving the inverter circuit 2 in response to a value of a gate reference signal G, a pulse width control circuit 5 for generating the gate reference signal G in response to a value of a pulse width reference signal Dc corrected by a gain revision circuit 33, the gain revision circuit 33 for correcting a pulse width reference signal D based on a detected output current value $I_L$ and the detected output voltage value Vc, a processing circuit 6 for calculating the pulse width reference signal D in response to the magnitude of an AC output voltage reference Vcr, a voltage detecting circuit 7 for detecting the AC output voltage Vc, and a current detector 31 for detecting the AC current $I_L$.

As shown in FIG. 1, the DC power source 1 may be an uninterruptible power supply including a converter circuit 91 for converting AC electric power supplied from a commercial electric power source 90 to DC electric power, and a storage battery 92 for supplying DC electric power in place of the DC electric power from the converter circuit 91 through a control 93 when the commercial electric power source 90 is interrupted.

The processing circuit 6, as shown in FIG. 1, comprises a mathematical model 8a for simulating dynamic characteristics of control objects including the pulse width control circuit 5, the gate logic circuit 4, the inverter circuit 2 and the output filter 3, a model control function 8b for controlling in a closed loop fashion outputs Im, Vm of the mathematical model 8a respectively corresponding to the current $I_L$ through a reactor L and the voltage Vc across a capacitor C, an output voltage control function 8c for approximating the voltage Vc across the capacitor C to the AC output voltage reference Vcr, and an adder 8d for deriving a voltage difference which is supplied to the output voltage control function 8c as an input signal, that is, a difference between the AC output voltage reference Vcr and the voltage Vc. The model control function 8b generates a manipulating variable Dm for the model and outputs the same as the pulse width reference signal D. Also, the output voltage control function 8c generates a reference value Vr for the model control function 8b.

Figure 2:
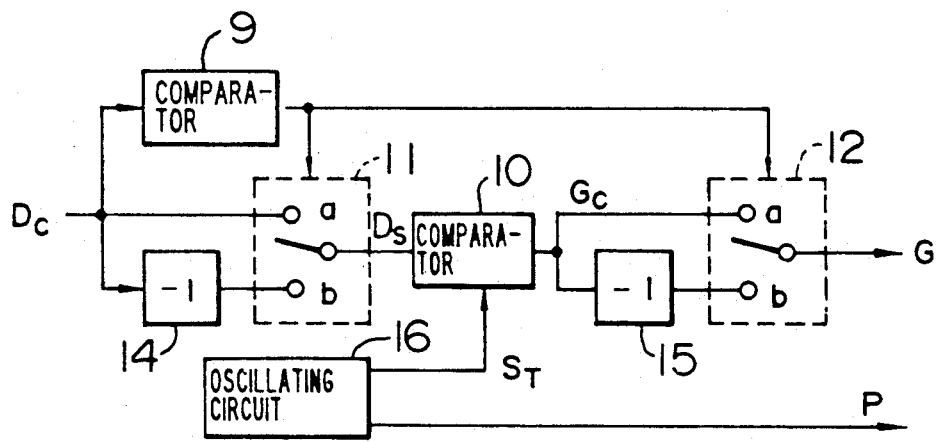
FIG. 2 is a detailed circuit block diagram illustrating a pulse width controlling circuit.

FIG. 2 is a block diagram showing the pulse width control circuit 5 in detail.

In FIG. 2, the pulse width control circuit 5 comprises comparators 9, 10, switches 11, 12, signal reversing circuits 14, 15 and an oscillating circuit 16. The circuit of FIG. 2 first determines whether the pulse width reference signal Dc presents a positive value or a negative value by means of the comparator 9. When the value of the signal Dc is positive, the comparator 9 generates an output signal at H (High Level), and the switch 11 is connected with a contact a, whereby Ds=Dc stands. On the contrary, when the value of the signal Dc is negative, the comparator 9 generates an output signal at L (Low Level), and the switch 11 is connected with a contact b, whereby the signal Dc reversed by the reversing circuit 14 is derived as the output from the switch 11, that is, Ds=−Dc stands.

Therefore, the signal Ds indicates an absolute value of the signal Dc. Next, the comparator 10 compares a triangular wave signal $S_T$ delivered from the oscillating circuit 16 with the signal Ds in magnitude. When $Ds > S_T$ stands, a signal Gc is set to H (High Level), whereas, when $Ds \leq S_T$ stands, the signal Gc is set to zero. The switch 12 is connected to a contact a when the output from the comparator 9 is at H (High Level) and the signal Gc is set equal to the gate reference signal G, in the same manner as the switch 11. On the other hand, when the output from the comparator 9 is at L (Low Level), the switch 12 is connected with a contact b, whereby the signal Gc is reversed by the reversing circuit 15 and accordingly G=−Gc stands. Also, the oscillating circuit 16 generates an interrupt pulse P in synchronism with the signal $S_T$ in addition to this signal $S_T$.

Figure 3:
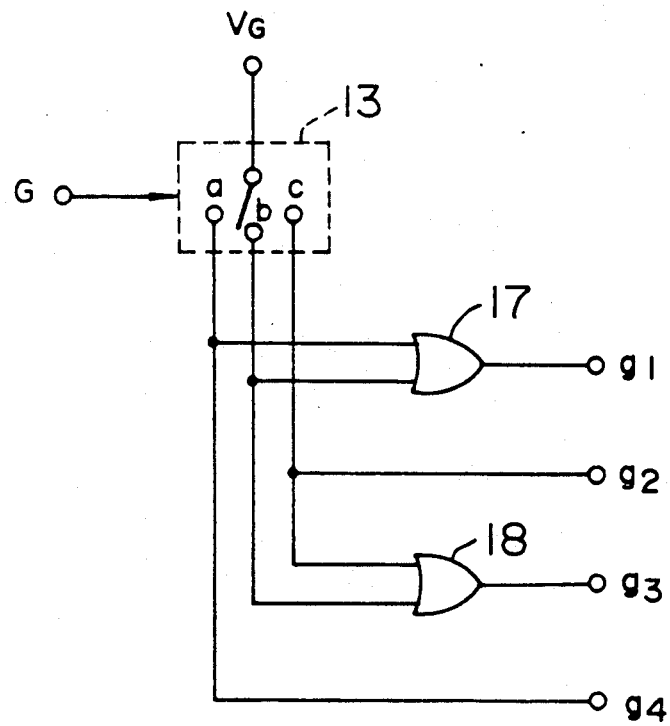
FIG. 3 is a detailed circuit diagram illustrating a gate logic circuit.

FIG. 3 shows the gate logic circuit 4 in detail which comprises a switch 13 and OR circuits 17, 18. The switch 13 in FIG. 3, operative in accordance with the magnitude of the signal G, is connected with a terminal a when G>0 stands, with a terminal b when G=0 stands, and with a terminal c when G<0 stands. Therefore, $g_1 = g_4 = V_G$ ($V_G$ designates a voltage source for driving gates comprised in the inverter) and $g_2 = g_3 = 0$ stand when G>0, $g_1 = g_3 = V_G$ and $g_2 = g_4 = 0$ stand when G=0, and $g_1 = g_4 = 0$ and $g_2 = g_3 = V_G$ stand when G<0.

Figure 4:
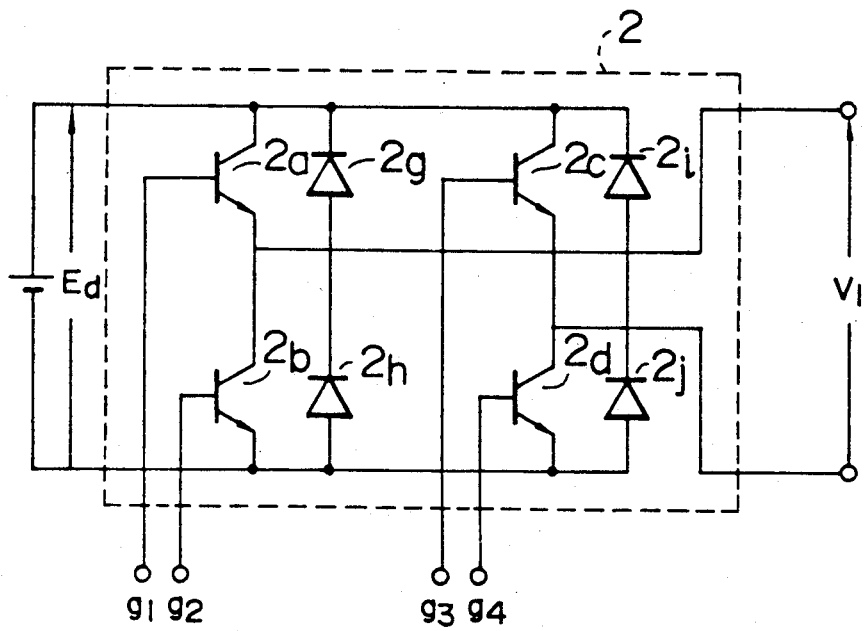
FIG. 4 is a detailed circuit diagram illustrating an inverter circuit.

FIG. 4 shows an example of the inverter circuit 2 which comprises transistors 2a, 2b, 2c and 2d and diodes 2g, 2h, 2i and 2j. The respective transistors are driven by the gate pulses $g_1$, $g_2$, $g_3$ and $g_4$, respectively.

Incidentally, predetermined effects can be produced without the gain revision circuit 33, so that the gain revision circuit 33 will be explained later in detail.

Figure 5:
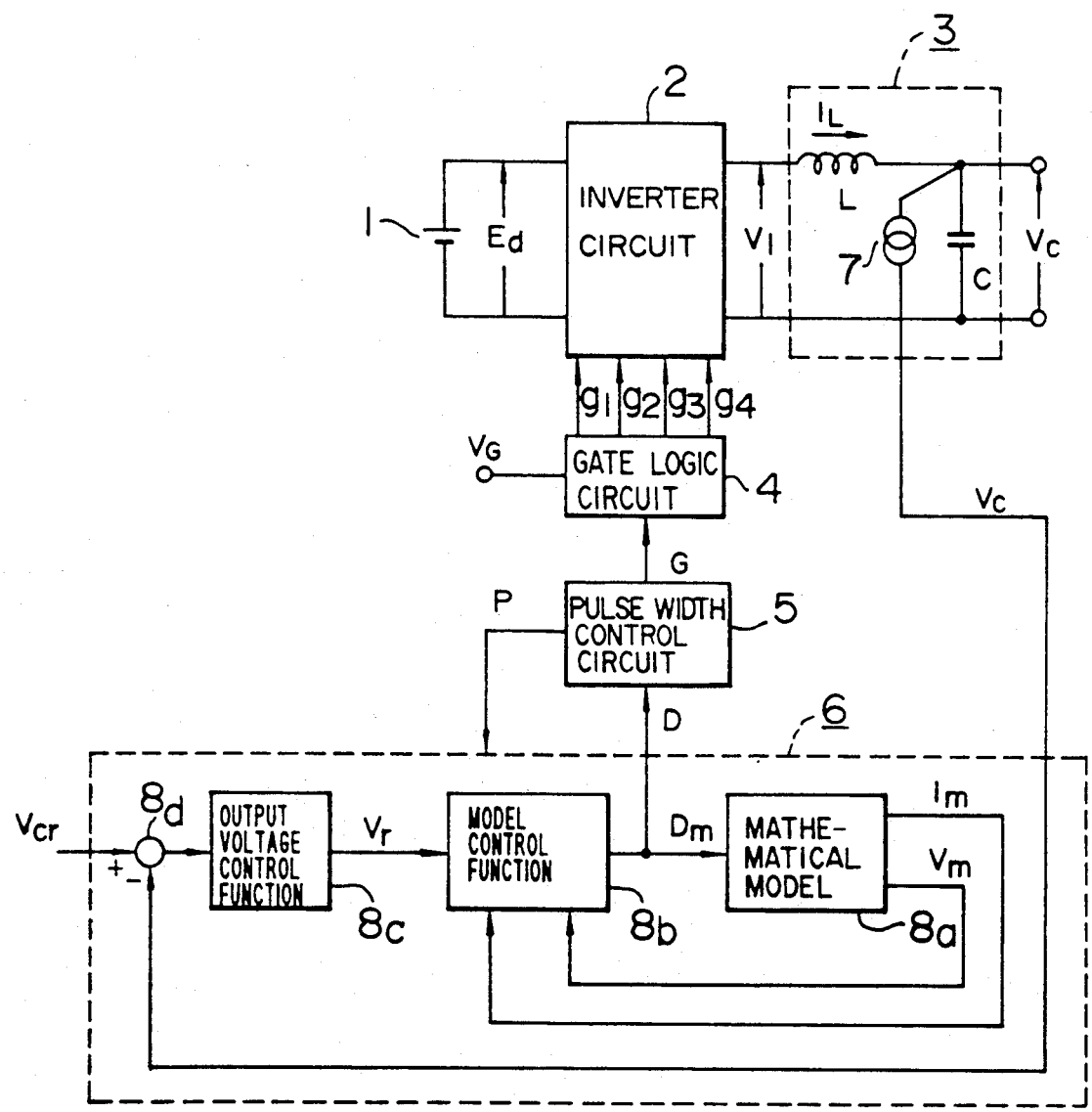
FIG. 5 is a block diagram illustrating a second embodiment of the present invention.
Figure 6:
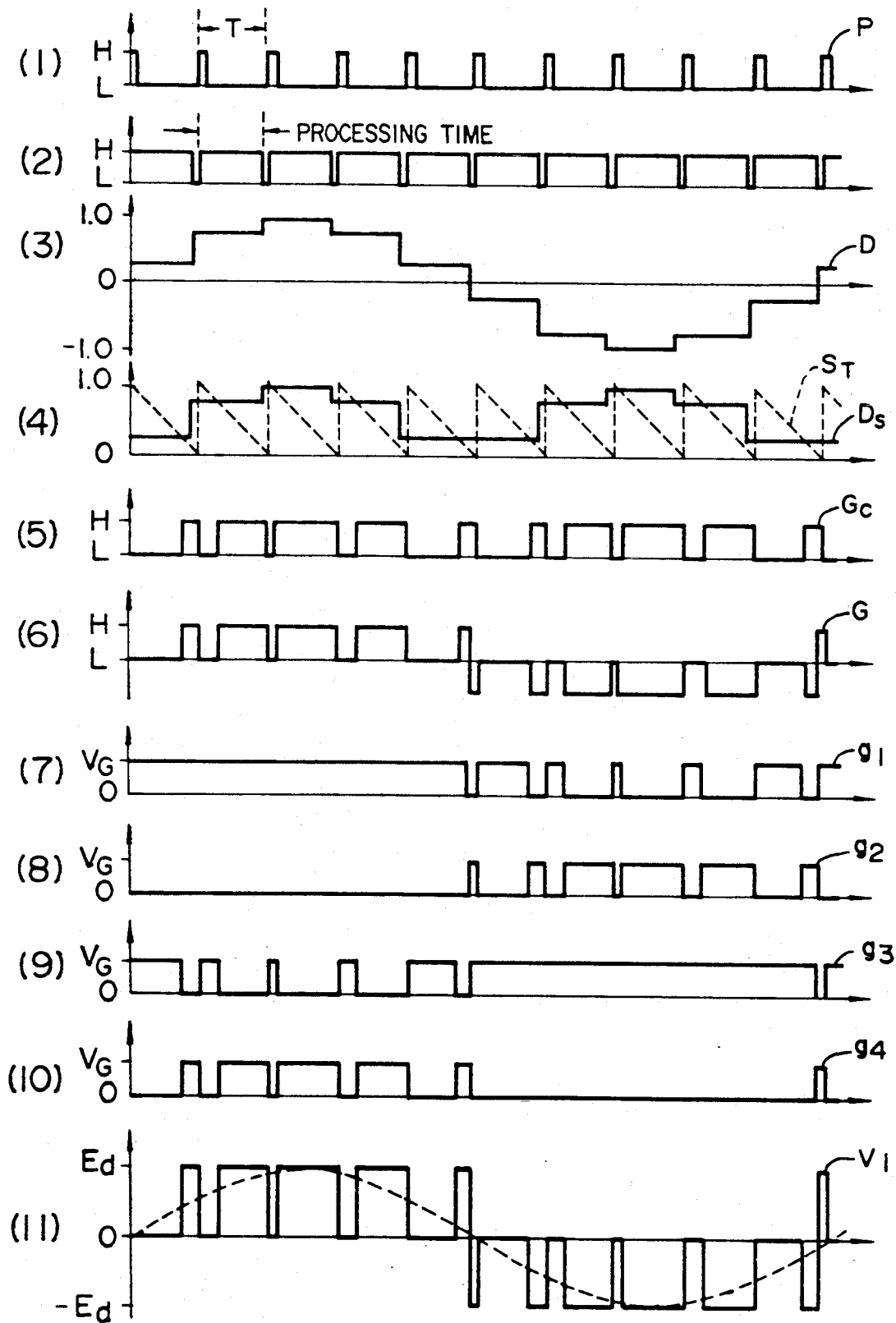
FIG. 6 shows charts (1)-(11) showing operating waveforms generated at respective different parts of FIG. 5.

FIG. 5 shows a whole circuit arrangement without the gain revision circuit 33 which differs from the circuit arrangement shown in FIG. 1 in that the output current detector 31 is not necessary in the circuit arrangement of FIG. 5. Next, FIGS. 6(1) through (11) show operating waveforms in the circuit of FIG. 5. FIG. 6(1) shows a waveform of the interrupt pulse P of a period T(s) generated by the pulse width control circuit 5. The processing circuit 6 is enabled at a rising edge of the interrupt pulse P and performs a processing for determining the pulse width control reference D. Assuming that a processing time is shown by a pulse waveform illustrated in FIG. 6(2), since a falling edge of the pulse indicates a processing terminated time, the waveform of the pulse width control reference D is varied in a step manner in synchronism with the falling edge of the pulse waveform of FIG. 6(2). Therefore, if the waveform D presents, for example, a form as shown in FIG. 6(3), the signal Ds in FIG. 2 is generated as indicated by a solid waveform in FIG. 6(4). At this time, the triangular wave signal $S_T$ is also generated as indicated by a phantom line in FIG. 6(4). Therefore, the gate pulses $g_1$, $g_2$, $g_3$ and $g_4$ are generated by the circuit of FIG. 3 as shown in FIGS. 6(7), (8), (9) and (10), respectively. In this event, the output voltage $V_I$ from the inverter circuit 2 presents a waveform indicated by a solid line in FIG. 6(11). This output voltage $V_I$ has its higher harmonic components removed by the output filter 3 and consequently shows a waveform as indicated by a phantom line in FIG. 6(11).

FIG. 7 is a flowchart showing a sequence of processing periodically performed by the processing circuit 6. The flowchart includes: "Take in AC output voltage reference Vcr and the AC output voltage Vc" at operation blocks 61, 62. "Calculate Voltage Difference" at 63. "Processing of Output Voltage Control Function" at 64. "Processing of Model Control Function" at 65. "Processing of Mathematical Model 66", and "Output Pulse Width Control Instruction D" at 67.

Next, a mathematical model treated in the next processing will be explained. Representing an input-output gain of the inverter 2 shown in FIG. 5 by K, the following differential equations stand:

$$dVc/dt = (1/C)I_L \quad (1)$$

$$dI_L/dt = (-1/L)V_c - (K/L)D \quad (2)$$

Assuming that the period of the interrupt pulse P is represented by T, and the values Vc, $I_L$ and and D at a time t = nT (n: integer) are represented by (Vc)n, $(I_L)$n and (D)n, respectively, in the above equations, the following difference equations are approximately derived:

$$\begin{bmatrix} (Vc)_{n+1} \\ (I_L)_{n+1} \end{bmatrix} = \begin{bmatrix} 1 - T^2/2LC & T/C \\ -T/L & 1 - T^2/2LC \end{bmatrix} \begin{bmatrix} (Vc)_n \\ (I_L)_n \end{bmatrix} - \begin{bmatrix} T^2/2LC \\ TK/L \end{bmatrix}(D)_n \quad (3)$$

Figure 8:
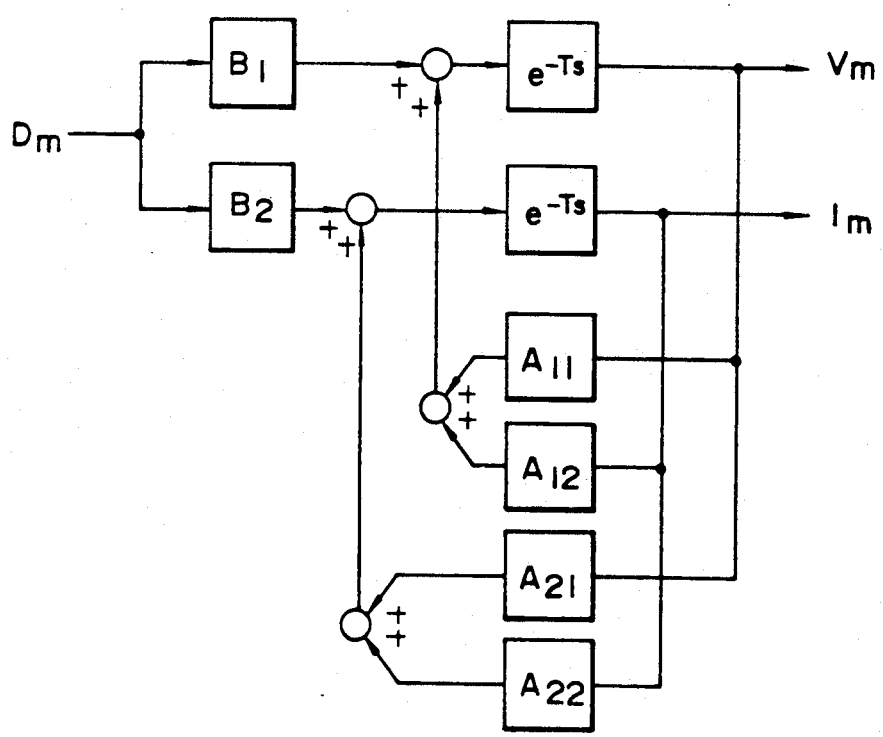
FIG. 8 is a block diagram illustrating a mathematical model.

Here, if (Vc)n, $(I_L)$n and (D)n are replaced by Vm, Im and Dm, respectively, ((Vc)n = Vm, $(I_L)$n = Im and (D)n = Dm), and $1 - T^2/2LC = A_{11}$, $T/C = A_{12}$, $-T/L = A_{21}$, $1-T^2/2LC = A_{22}$, $T^2K/2LC = B_1$, and $TK/L = B_2$ are defined, the following equation (4) is introduced from the above formula (3):

$$\begin{bmatrix} zVm \\ zIm \end{bmatrix} = \begin{bmatrix} A_{11} & A_{12} \\ A_{21} & A_{22} \end{bmatrix} \begin{bmatrix} Vm \\ Im \end{bmatrix} - \begin{bmatrix} B_1 \\ B_2 \end{bmatrix}Dm \quad (4)$$

where z represents a time element exp(Ts) in the Laplace transform. If the formula (4) is represented by a block diagram, FIG. 8 is derived. The model control function 8b is generally given by the following equation:

$$Dm = a_1 Vr - a_2 Vm - a_3 Im \quad (5)$$

Figure 9:
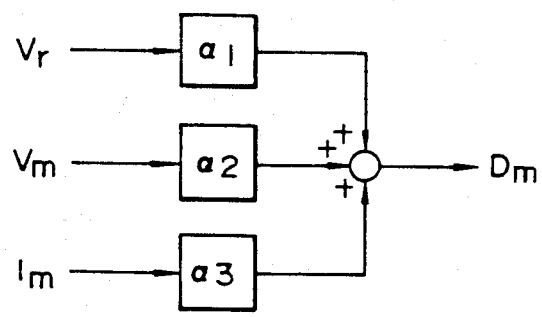
FIG. 9 is a block diagram illustrating a model control function.

Therefore, if the equation (5) is represented by a block diagram, FIG. 9 is derived. A response characteristic of a closed loop system including the model control function 8b and the mathematical model 8a shown in FIG. 8 is determined by the control constants $a_1$, $a_2$ and $a_3$ in the above equation (5).

Figure 10:
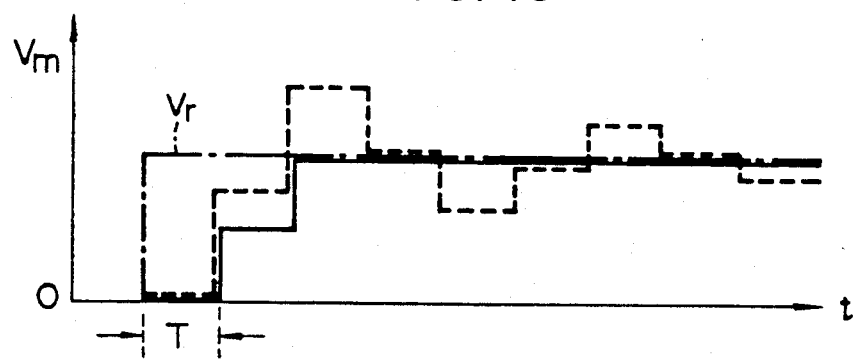
FIGS. 10 and 11 are graphs showing response characteristics of a model control function and a mathematical model, respectively.

FIG. 10 shows a response characteristic of a closed loop system including the model control function 8b and the mathematical model 8a. If the reference value Vr is varied in a step manner as indicated by a one-dot chain line in FIG. 10, the response Vm generally follows as indicated by a phantom line in FIG. 10. However, a control object as given by a difference equation as the equation (3) can fulfil a response characteristic, as indicated by a solid line, which is stabilized in a finite time period. The stabilizing time period in this event is given by a time period nT in the case of an (n)th closed loop system. Since the present embodiment treats a second closed system, the system is stabilized within a time period of 2T. Such high speed response control characteristic cannot be fulfilled if a delay due to a processing time of a processing circuit or the like exists in the closed loop system. Nevertheless, the closed loop system in the present embodiment is included in the processing circuit 6, which permits a free building of an ideal system. Thus, it is possible to fulfill the abovementioned high speed response control characteristic. In the present embodiment, the manipulating variable Dm of the mathematical model is employed as it is as the manipulating variable D for a control object, so that the voltage Vc from the output filter follows Vm with a delay time T, as shown in FIG. 11, whereby Vc is consequently controlled in response to Vr.

Figure 12:
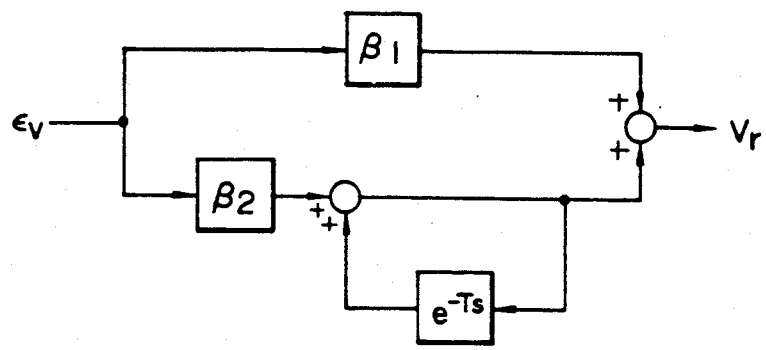
FIG. 12 is a block diagram illustrating an output control function.

FIG. 12 is a block diagram showing the output voltage control function 8c wherein an ordinary proportional-plus-integral control function is applied as the output voltage control function 8c. References $\beta_1$, $\beta_2$ designate a proportional gain and an integral gain, respectively, and ev designates a voltage deviation. Since the output voltage control function 8c represented by the block diagram of FIG. 12 has an integral characteristic, a voltage deviation is zero in a normal state.

Figure 11:
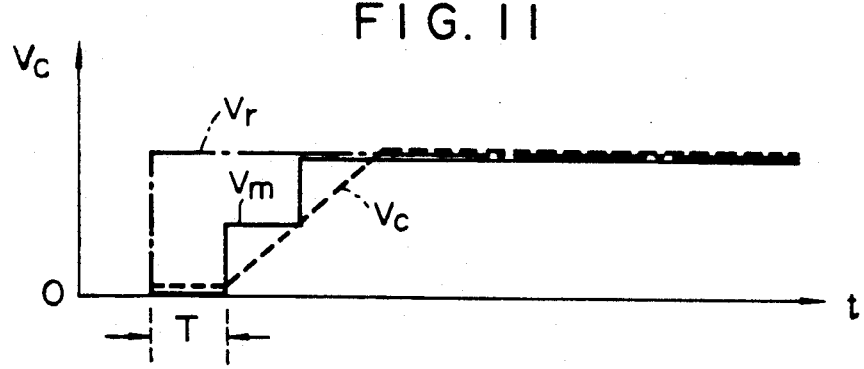

According to the present embodiment as shown in FIG. 11, the output voltage Vc stably responds to the reference value Vr at a higher speed, so that the output voltage control function 8c is also provided with a high speed response characteristic, which consequently enables the output voltage Vc to stably respond to the AC output voltage reference Vcr at a high speed.

Figure 13:
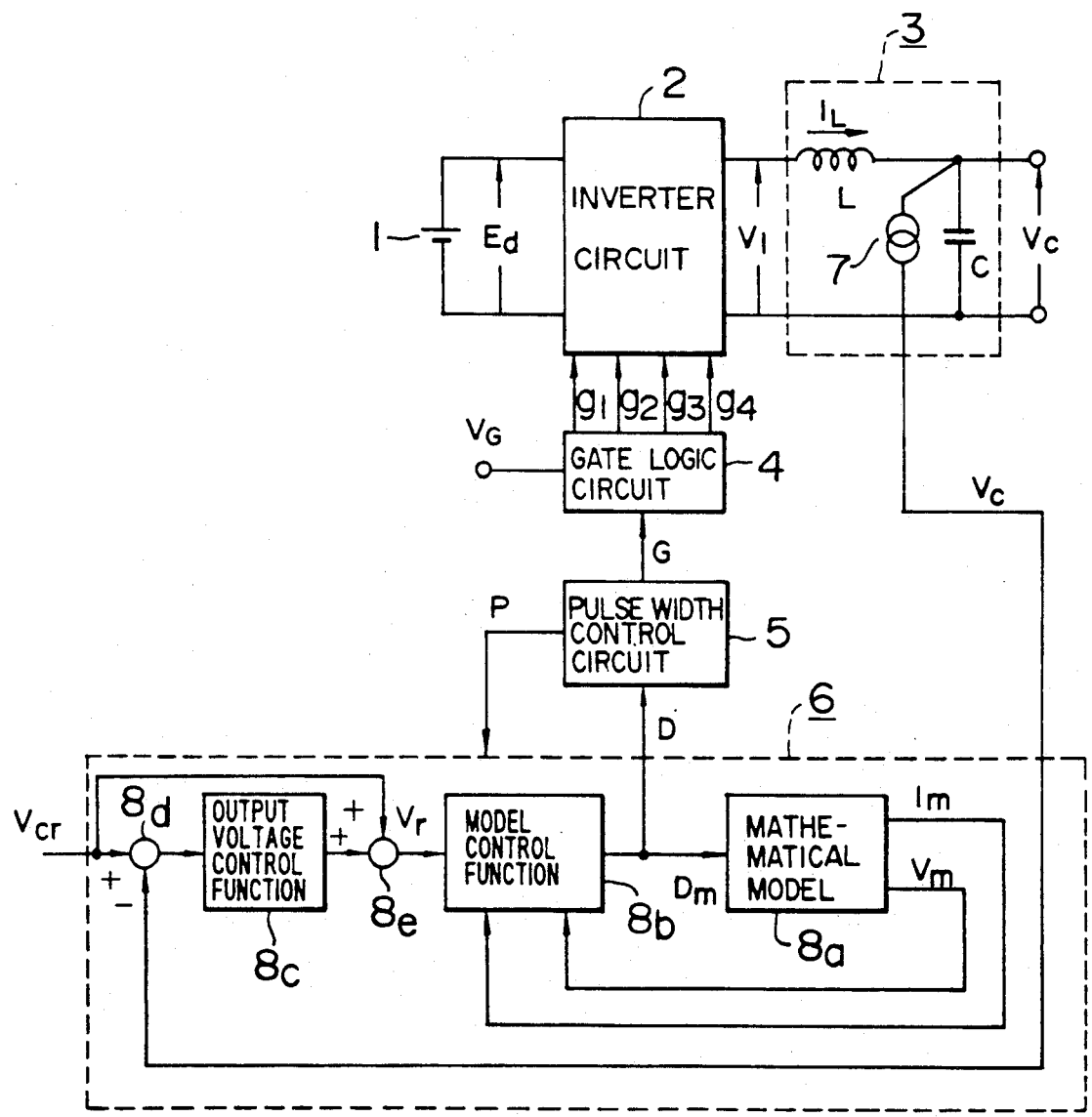
FIG. 13 is a block diagram illustrating a whole arrangement of a third embodiment of the present invention.

FIG. 13 shows a modified example in which the reference value Vr for the model control function 8b is given by the sum of the outputs from the output voltage control function 8c and the AC output voltage reference Vcr, the total being generated by a newly provided adder 8e. Such modification allows the model control function 8b to directly respond to the AC output voltage reference Vcr, which results in enabling the output voltage Vc to respond to the AC output voltage reference Vcr at a higher speed.

Figure 14:
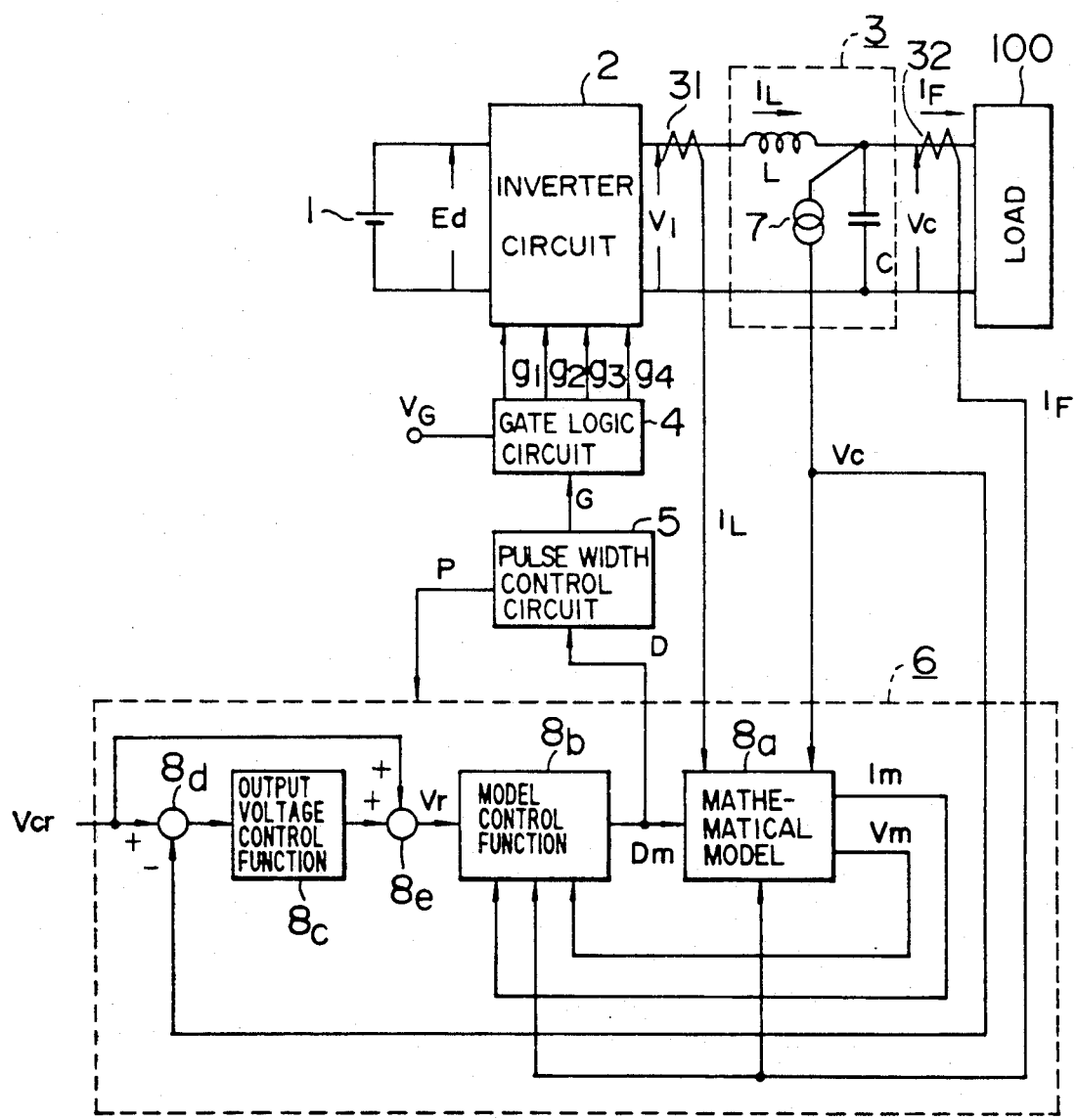
FIG. 14 is a block diagram illustrating a whole arrangement of a fourth embodiment of the present invention.
Figure 15:
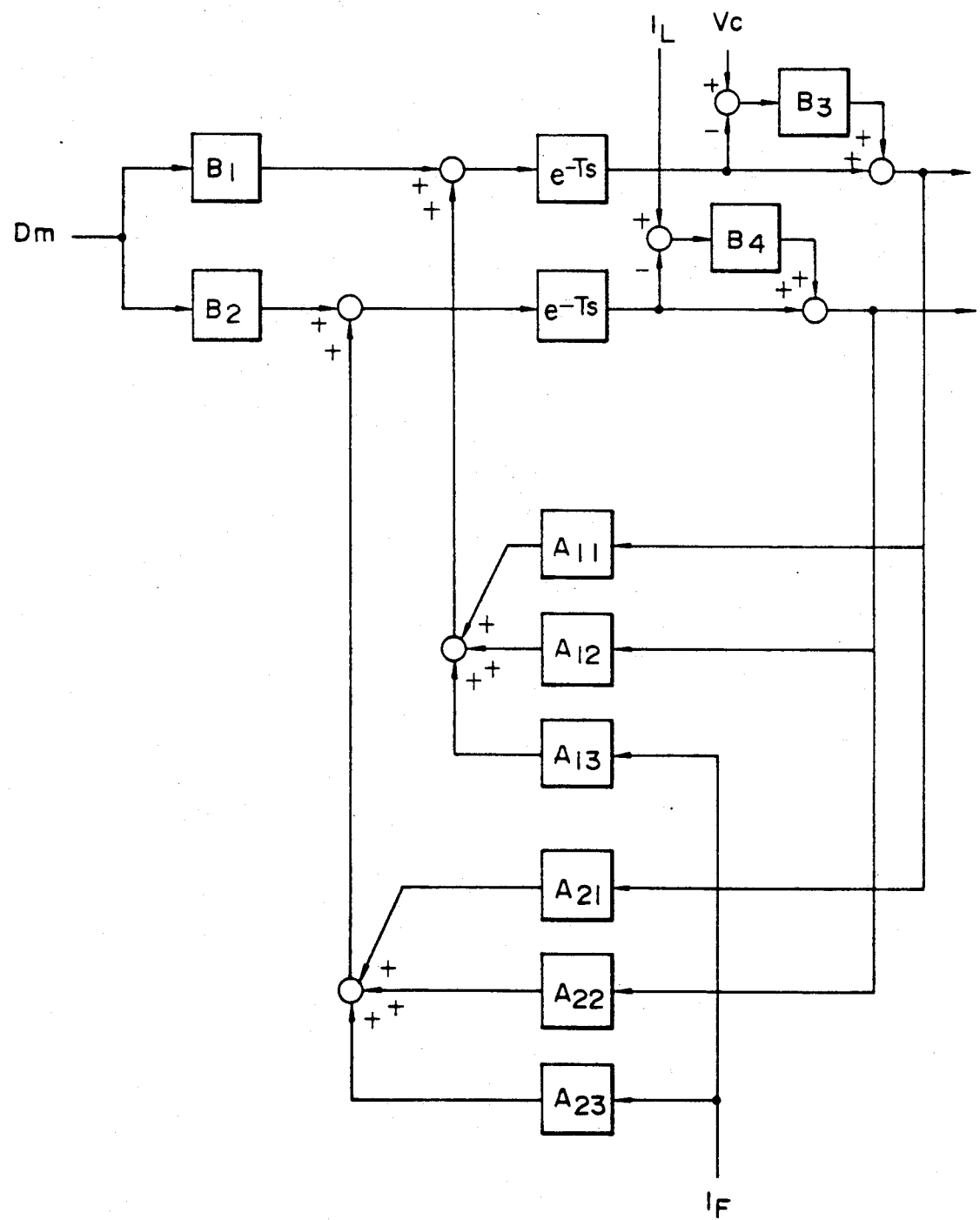
FIG. 15 is a block diagram illustrating a mathematical model of the fourth embodiment.
Figure 16:
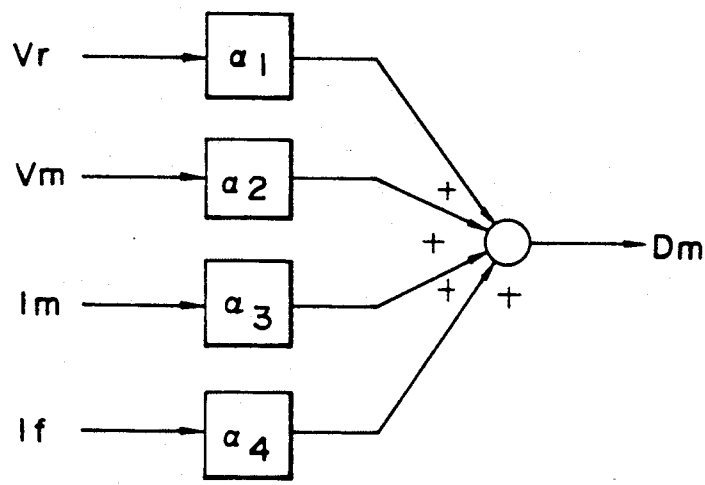
FIG. 16 is a block diagram illustrating a model control function of the fourth embodiment.

FIGS. 14, 15 and 16 show another modified example in which states of the mathematical model 8a and the model control function 8b are modified by a current $I_F$ flowing to the load 100 and a state of the mathematical model 8a is modified by the current $I_L$ through the reactor L and the output voltage Vc. FIG. 14 is a block representation of a control system. In this modified example, the currents $I_L$, $I_F$ are detected by current detectors 31, 32, respectively. The operation performed by the mathematical model 8a in FIG. 14 is as shown in FIG. 15, wherein the outputs Vm, Im of the mathematical model 8a are modified by the current $I_F$ through gains $A_{13}$, $A_{23}$, respectively. Also, the outputs Vm, Im of the mathematical model 8a are modified by the difference between the output voltage Vc and the output voltage Vm of the mathematical model 8a and the difference between the reactor current $I_L$ and the output current Im of the mathematical model 8a through gains $B_3$, $B_4$. FIG. 16 shows the operation of the model control function 8b in FIG. 14, wherein the manipulating variable Dm, that is, the manipulating variable D is modified by the load current $I_F$ through a gain $a_4$. Generally, as the load current $I_F$ is increased, the voltage across the filter capacitor C, that is, the output voltage Vc is decreased. However, in the modified example of FIG. 14, as the load current $I_F$ is increased, the manipulating variable D is also increased simultaneously, whereby the output voltage from the inverter 2 is increased to thereby promptly prevent the voltage decrease. Also, the model control function 8b is operated so as to suppress fluctuation in the output voltage Vc with respect to fluctuation in the reactor current $I_L$ and the output voltage Vc.

Figure 17:
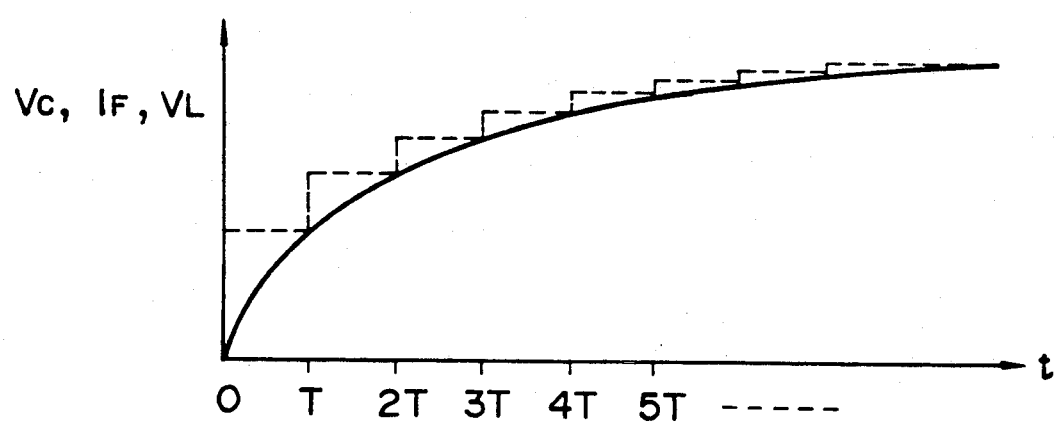
FIG. 17 is a graph illustrating how a load current, a filter current and an output current are changed during each sampling period.

FIG. 17 is a graph used for explaining a problem in detecting the reactor current $I_L$ and the output voltage Vc. For example, if values such as $I_L$, $I_F$, Vc and the like are present as indicated by a solid line in FIG. 17, these values are detected only at each sampling time of the processing circuit 6, so that the processing circuit 6 determines that the values after detection are as indicated by a phantom line in FIG. 17. As a result, a detection error as shown by a gap between the solid line and the phantom line occurs, which may make the control system unstable. For this reason, such error in detected values should be corrected. There may be a variety of error correcting methods, however, it will be sufficiently effective to calculate a mean value between a value detected at the previous sampling and a currently detected value.

Next, explanation will be given of a case, as shown in FIG. 1, where the gain revision circuit 33 is arranged between the pulse width control circuit 5 and the processing circuit 6.

Figure 18:
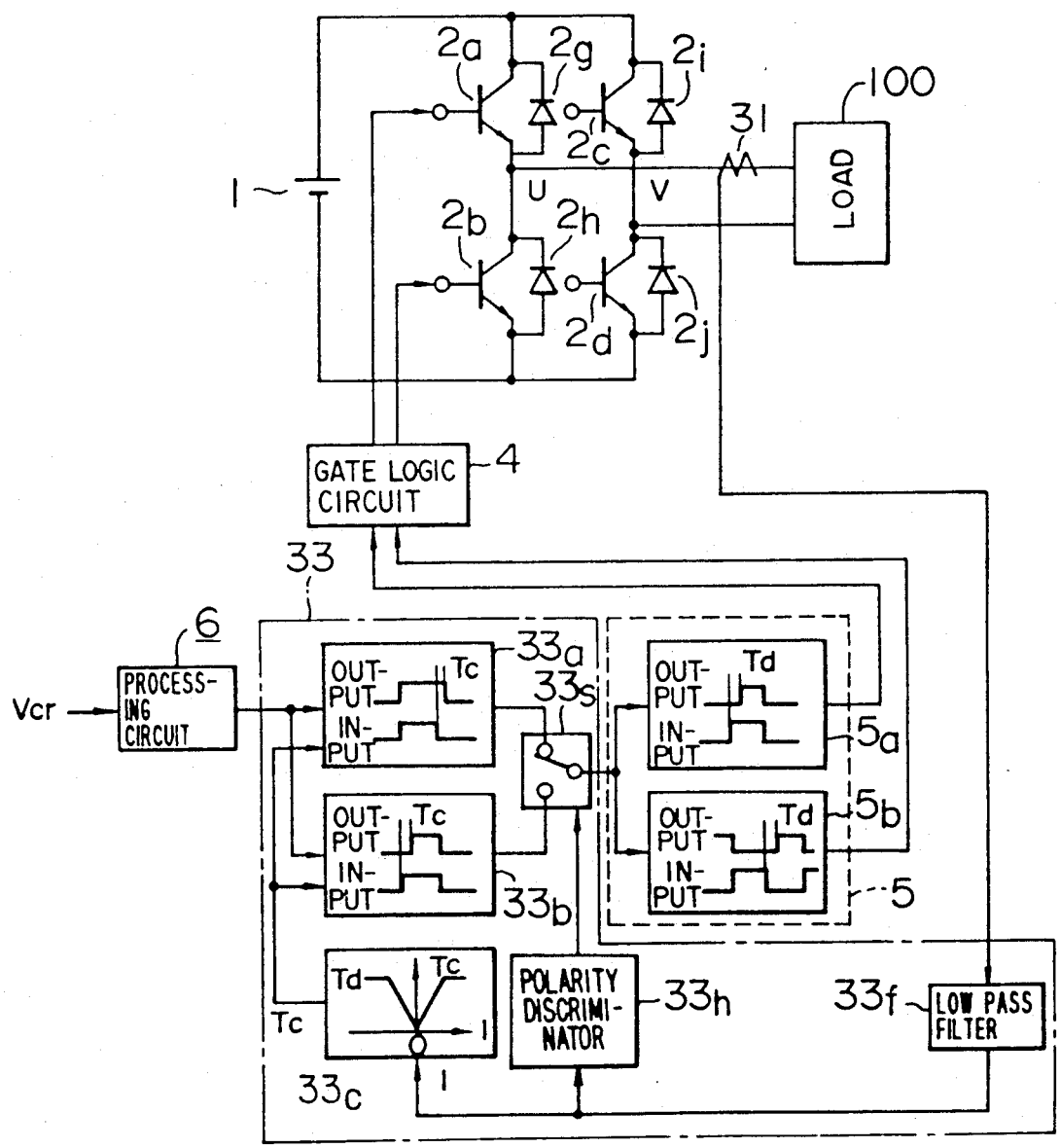
FIG. 18 is a schematic circuit diagram illustrating an embodiment of a gain revision circuit.
Figure 19:
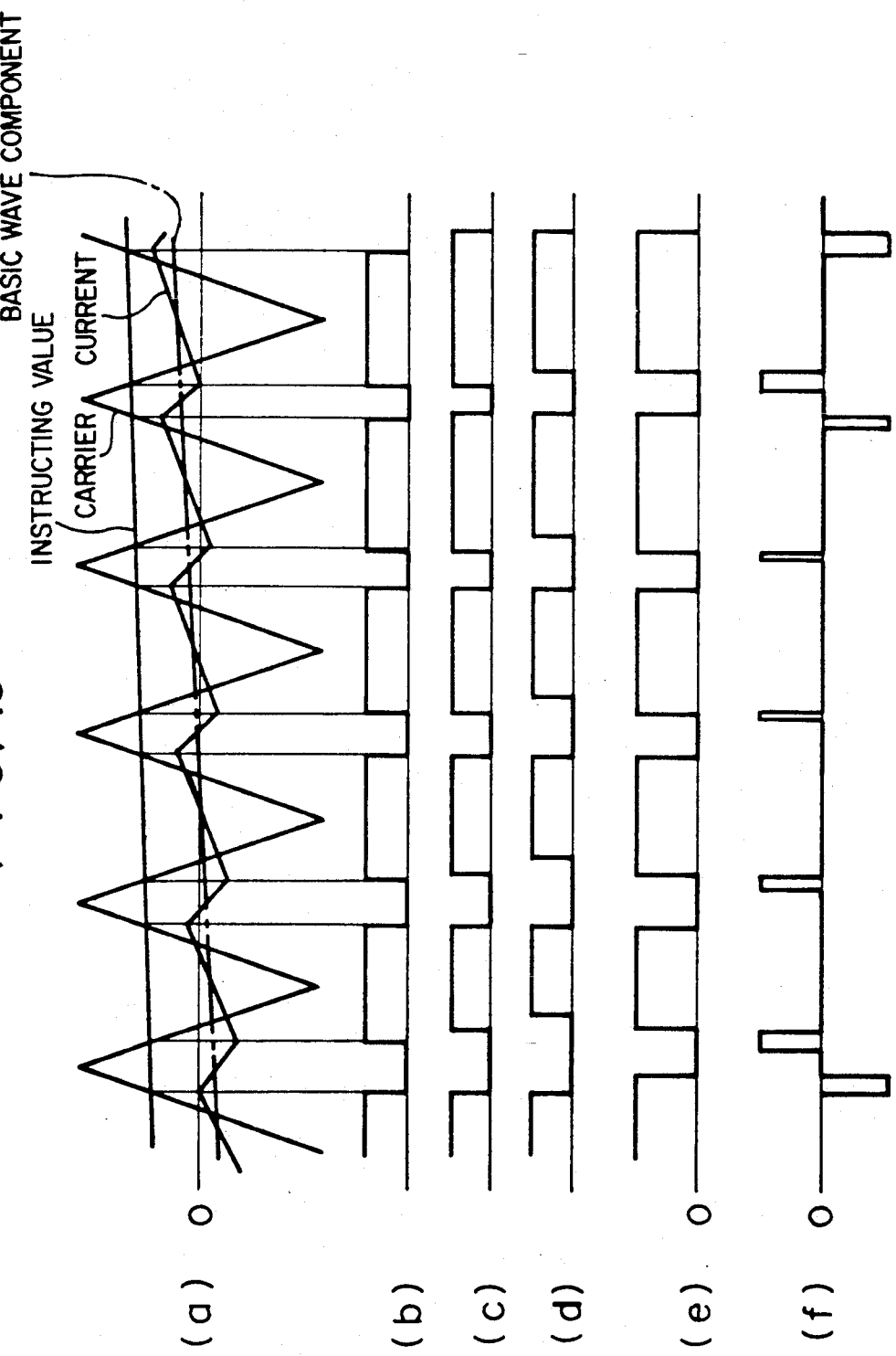
FIG. 19 shows waveform charts (a)-(g) used for explaining the operation of the gain revision circuit shown in FIG. 18.

FIG. 18 shows an example of a gain revision circuit. In the drawing, a main circuit section has a construction substantially equivalent to that of FIG. 1, however, the filter circuit 3 is omitted. Further, the processing circuit 6 is applied with an output from a voltage detector arranged in the filter circuit 3 and an output from the pulse width control circuit 5, however, these outputs are omitted in FIG. 18, since FIG. 18 is used for explaining the gain revision circuit 33.

In FIG. 18, the gain revision circuit 33 comprises a low pass filter 33f for removing noise components from an output from the current detector 31 and thereby deriving a basic wave current component, a pulse width extender 33a, a pulse width retractor 33b, a pulse width correcting variable generator 33c, a change-over switch 33s and a polarity discriminator 33g. Next, the operation of the gain revision circuit 33 will be explained with reference to FIGS. 18 and 19(a) through (f). In FIGS. 19(a) through (f), (a) shows a carrier signal, the output voltage reference or instructing value, the output current and the basic component of the output voltage, (b) a pulse width modulated signal, (c) input signals applied to on-delay generators 5a, 5b arranged in the pulse width control circuit 5, (d) a driving signal for driving a switching element 2a, 2b of the main circuit section, (e) a voltage waveform at a point U, and (f) a voltage error.

In the embodiment of the present invention shown in FIG. 18, the pulse width correcting variable generator 33c determines a correcting variable for the pulse width from an instantaneous value of the basic wave component of the output current which is derived from a current value detected by the current detector 31 through the low pass filter 33f. The correcting variable is applied to the pulse width extender 33a and the pulse width retractor 33b.

When a given instantaneous value of the output current basic wave component is small, the pulse width correcting variable generator 33c generates a correcting variable having a small value which is proportional to the instantaneous value. On the contrary, if the instantaneous value of the output current basic wave component exceeds a predetermined value, the correcting variable generator 33c generates a correcting variable having a predetermined value.

The pulse width extender 33a extends a pulse width of the pulse width reference signal D from the processing circuit 6 by a correcting variable determined by the pulse width correcting variable generator 33c, while the pulse width retractor 33b retracts the pulse width by a correcting variable in the same manner as the pulse width extender 33a.

A change-over switch 33s is changed over to the side of the pulse width extender 33a when the basic wave component of the output current shows the positive polarity and to the side of the pulse width retractor 33b when the basic wave component of the output current shows the negative polarity. In this event, the polarity of the current is determined with respect to the polarity of the voltage. On-delay generators 5a, 5b in the pulse width control circuit 5 provide an on-delay Td for an input pulse, and the gate logic circuit 4 generates driving signals for driving switching elements 2a, 2b, respectively. Driving signals for driving switching elements 2c, 2d are also generated in the same manner as described above.

The above described embodiment is adapted to change a correcting variable in response to an instantaneous value of the basic wave component of the output current in a region where the polarity of the output current is reversed during a half period of a carrier, which results in reducing a voltage error in every pulse. compared with the prior art, as shown in FIG. 2(f), thereby making it possible to substantially suppress the total of voltage errors to zero in the region where the polarity of the output current is reversed during a half period of the carrier.

Figure 20:
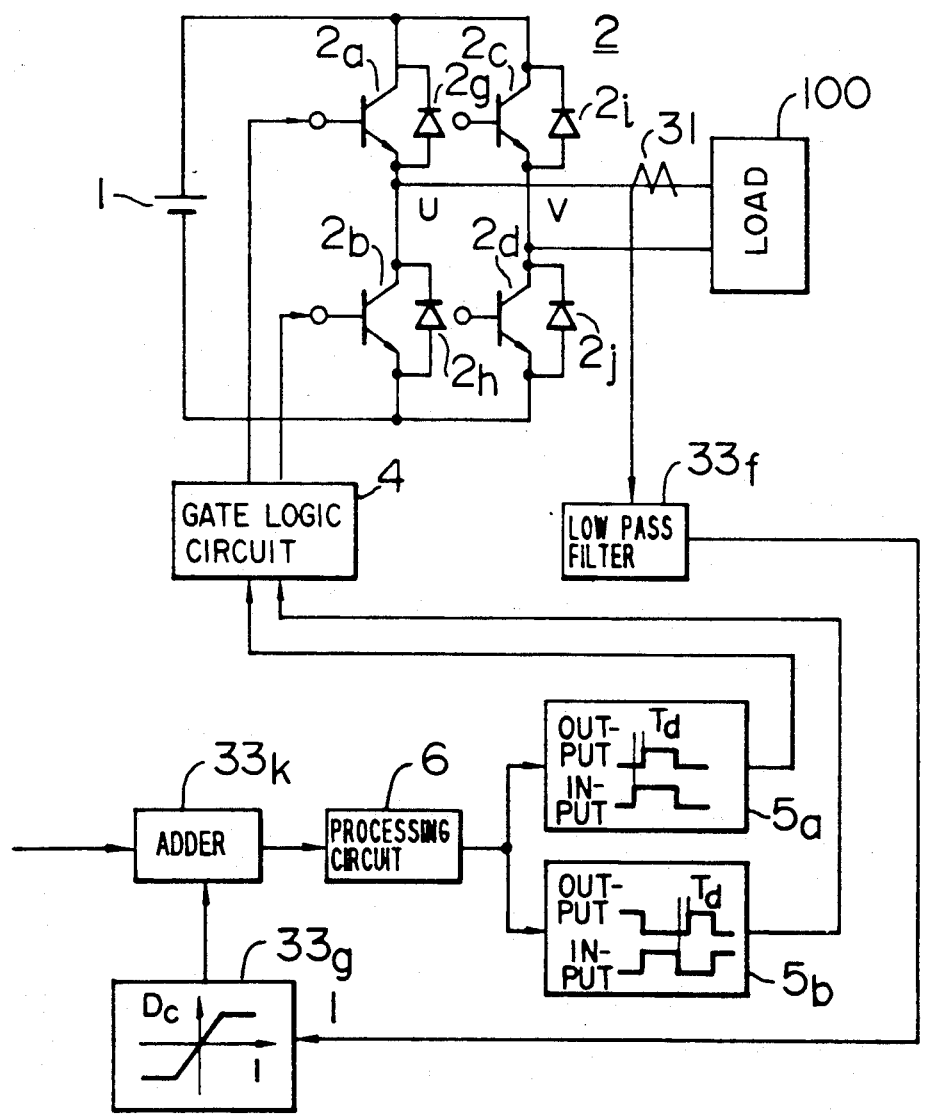
FIG. 20 is a block diagram illustrating a second embodiment of a gain revision circuit.
Figure 21:
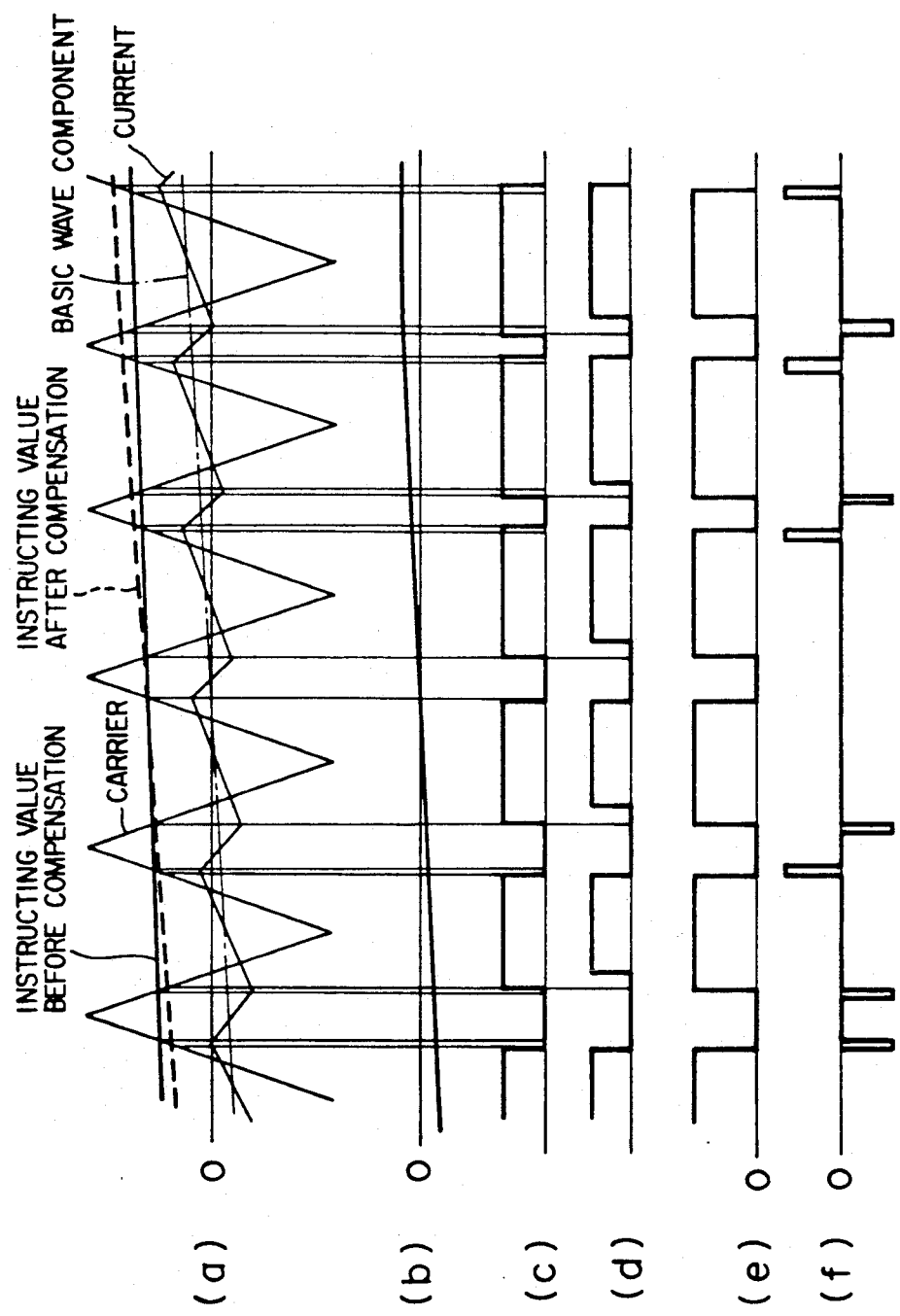
FIG. 21 shows waveform charts (a)-(f) used for explaining the operation of the gain revision circuit shown in FIG. 20.

FIG. 20 is a block diagram showing a construction of a second embodiment of a gain revision circuit, and FIGS. 21(a) through 21(f) are waveform charts for explaining the operation of the gain revision circuit. In FIG. 20, reference numeral 33g designates an output voltage reference correcting variable generator and 33k an adder. Other reference numerals designate the same elements as those in FIG. 18. Also, FIG. 21(a) shows the carrier signal, the output voltage reference or instructing value, the output current, the basic wave component of the output current, and the output voltage reference or instructing value after correction. FIG. 21(b) an output current reference correcting variable, FIG. 21(c) a pulse width modulated signal, FIG. 21(d) a driving signal for driving a switching element 2a, 2b, FIG. 21(e) a voltage at a point U, and FIG. 21(f) a voltage error.

The second embodiment of the gain revision circuit shown in FIG. 20 is adapted to add an on-delay correcting amount to the output voltage instructing value.

The output voltage reference correcting variable generator 33g in the second embodiment of the gain revision circuit as illustrated determines a correcting variable for the output voltage reference based on an instantaneous value of the basic wave component of the output current applied thereto through the low pass filter 33f and applies the correcting variable to the adder 33k, in the same manner as the foregoing first embodiment of the gain revision circuit.

The output voltage reference correcting variable generator 33g in this embodiment generates such correcting variable in the same manner as the pulse width correcting variable generator 33c explained with reference to FIG. 18.

The adder 33k adds the correcting variable from the output voltage reference correcting variable generator 33g to the output voltage reference Vcr to generate a corrected output voltage reference which in turn is used to generate the pulse width reference signal D by the processing circuit 6.

The on-delay generators 5a, 5b provide the output from the processing circuit 6 with an on-delay by an amount of Td to generate driving signals for driving the switching elements 2a, 2b, respectively.

The above explained second embodiment is quite simple in construction in that it does not require a pulse width extender or a pulse width retractor, but can produce the same effect as the first embodiment explained with reference to FIG. 18, that is, reducing distortion in the output waveform.

Figure 22:
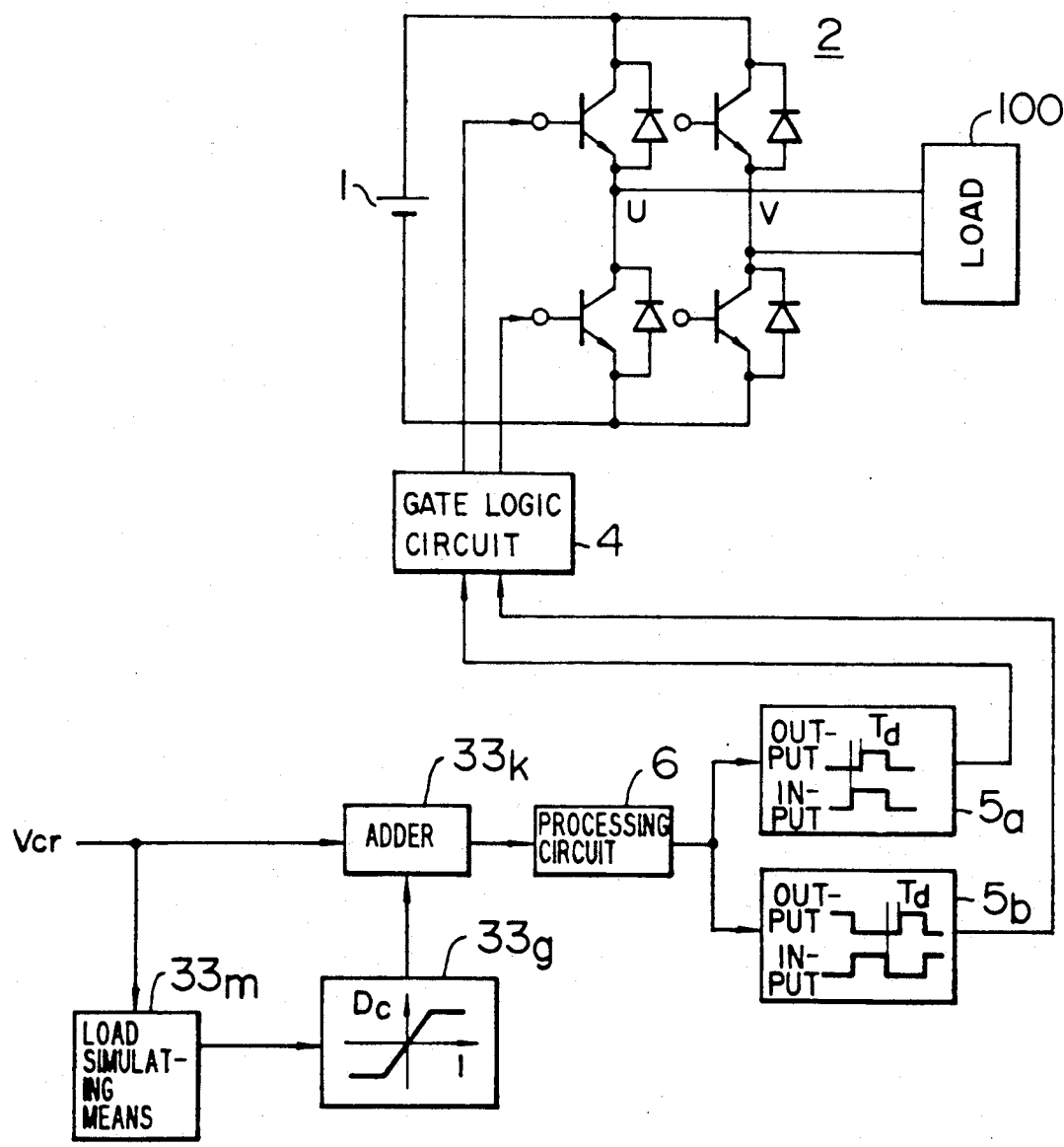
FIGS. 22 through 26 are block diagrams respectively illustrating third through seventh embodiments of gain revision circuits.

FIG. 22 is a block diagram showing a construction of a third embodiment of a gain revision circuit. In FIG. 22, reference numeral 33m designates load simulating means, and other reference numerals designate the same elements as those in FIG. 20.

The third embodiment of the gain revision circuit is adapted to generate an instantaneous value of the basic wave component of the output current from the load simulating means 33m, based on the second embodiment shown in FIG. 20.

This embodiment can eliminate the necessity of detecting the output current, which results in reducing distortion in the output waveform by an extremely simple construction.

Figure 23:
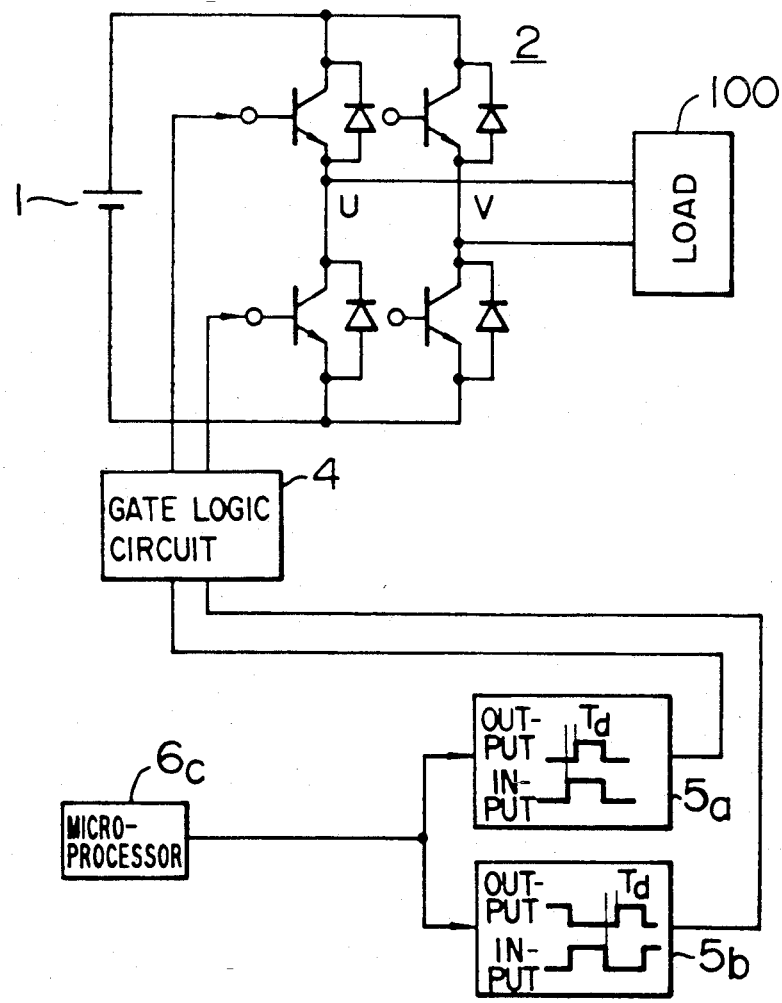

FIG. 23 is a block diagram showing a construction of a fourth embodiment of a gain revision circuit. In FIG. 23, reference numeral 6c designates a microprocessor, and other reference numerals designate the same elements as those in FIG. 22.

The fourth embodiment of the gain revision circuit utilizes the microprocessor 6c to implement by software generation the output voltage reference Vcr, the processing circuit 6, the output voltage reference correcting variable generator 33g, the adder 33k and the load simulating means 33m.

This embodiment makes it possible to reduce distortion in the output waveform by a minimum hardware construction.

Figure 24:
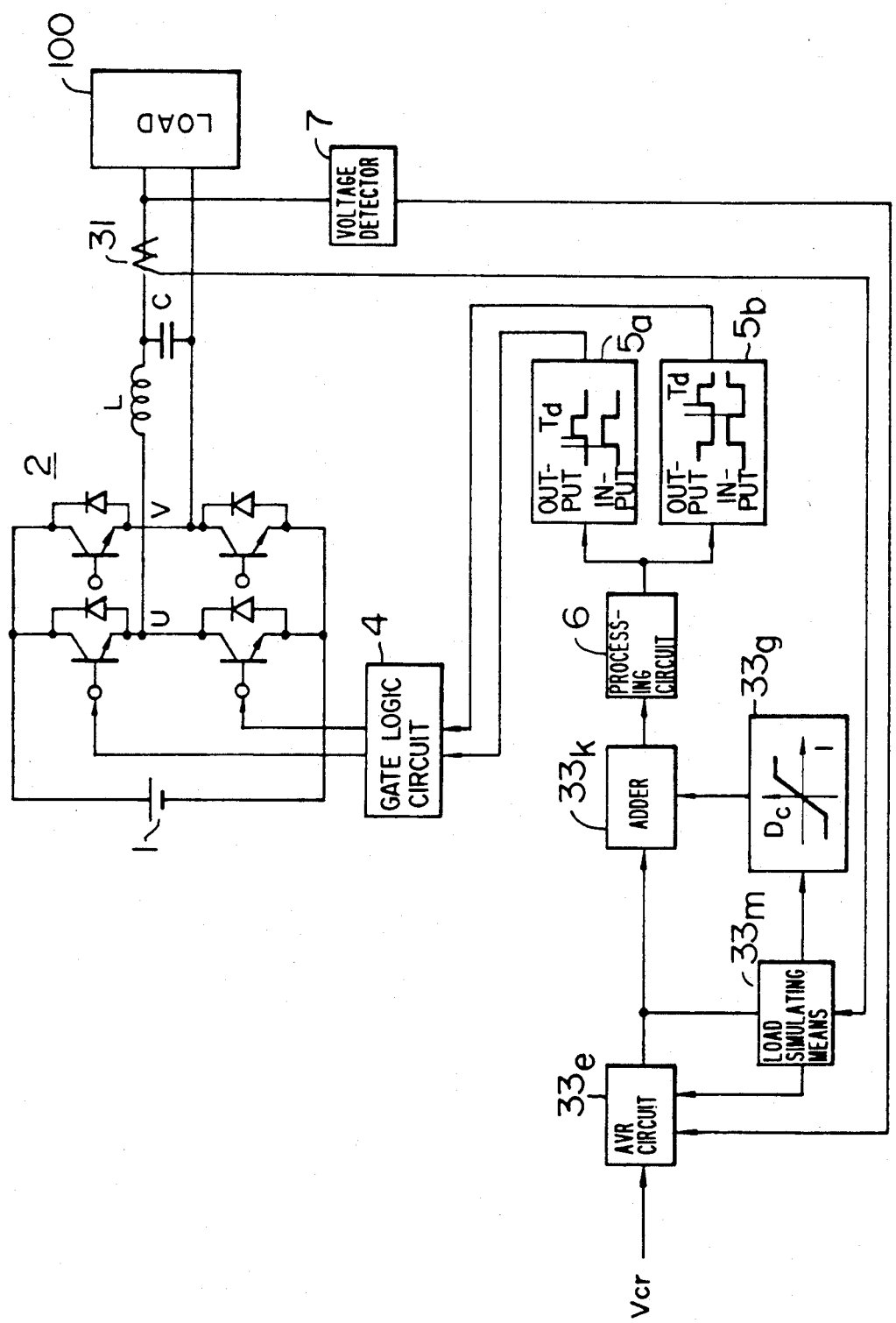

FIG. 24 is a block diagram showing a construction of a fifth embodiment of a gain revision circuit. In FIG. 24, reference numeral 33e designates an AVR (Automatic Voltage Regulator) circuit and 7 a voltage detector, and other reference numerals designate the same elements as those in FIG. 22.

In this fifth embodiment, the load 100 appearing in FIG. 1 is connected in parallel with the capacitor C in a smoothing circuit formed of the reactor L and the capacitor C, and the AVR circuit 33e is provided so as to make a voltage across the capacitor C coincide with the output voltage reference value.

Specifically, the AVR circuit 33e corrects the output voltage reference so as to reduce to zero an error voltage which is the difference between the output voltage reference value and a voltage across the capacitor C detected by the voltage detector 7, which results in the voltage across the capacitor C coinciding with the output voltage reference value.

Also, an inverter employed in this embodiment has a construction of a pulse width modulation type inverter for uninterruptible power supply, and therefore the present embodiment can provide an uninterruptible power supply presenting a reduced distortion in the output voltage waveform.

Figure 25:
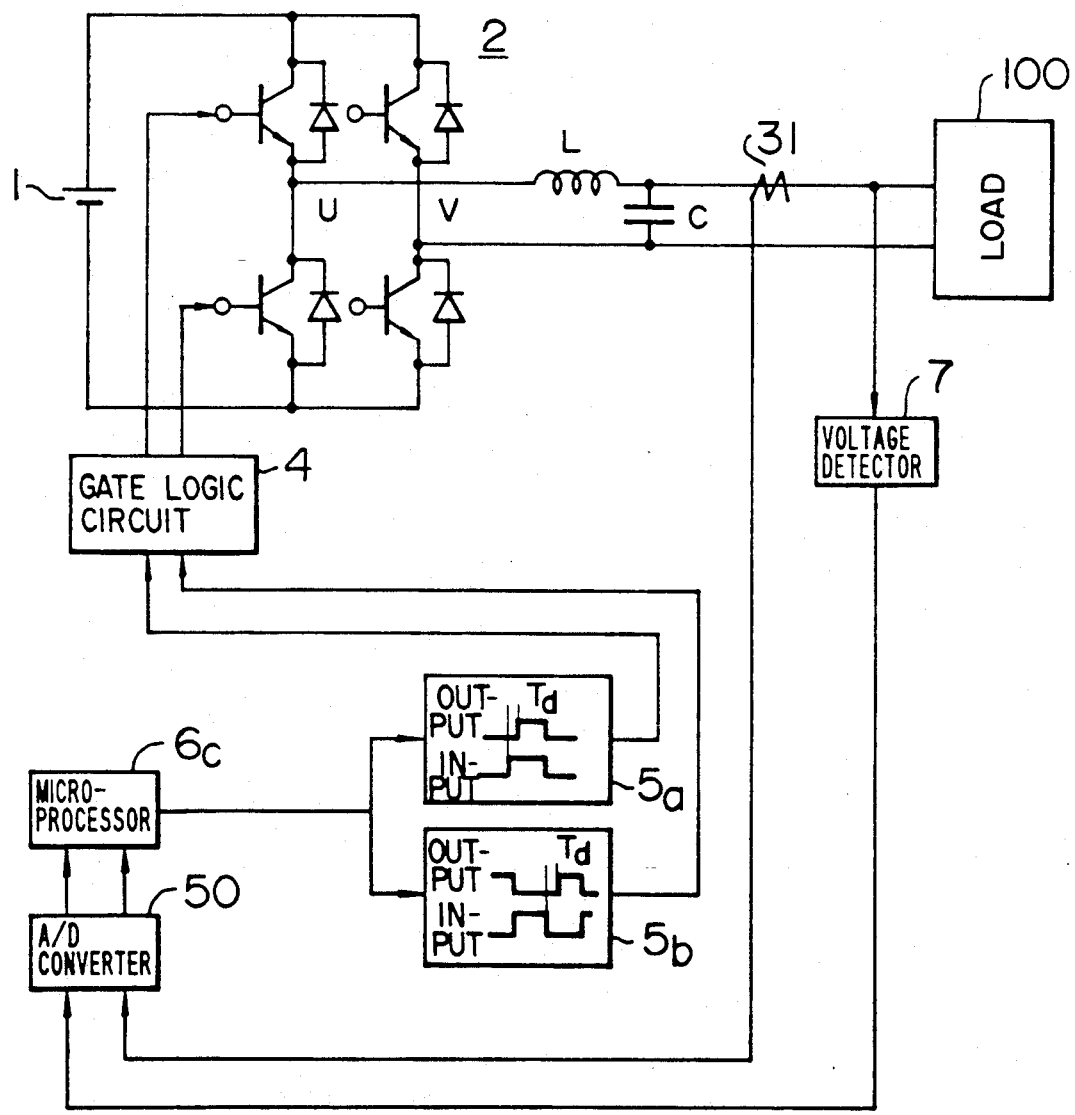

FIG. 25 is a block diagram showing a construction of a sixth embodiment of a gain revision circuit. In FIG. 25, reference numeral 50 designates an analog-to-digital (A/D) converter, and other reference numerals designate the same elements as those in FIGS. 23, 24.

This sixth embodiment utilizes the microprocessor 6c to implement by software generation the output voltage reference Vcr, the processing circuit 6, the output voltage reference correcting variable generator 33g, the adder 33k and the load simulating means 33m.

According to the sixth embodiment, it is possible to provide an uninterruptible power supply presenting a reduced distortion in the output voltage waveform.

Figure 26:
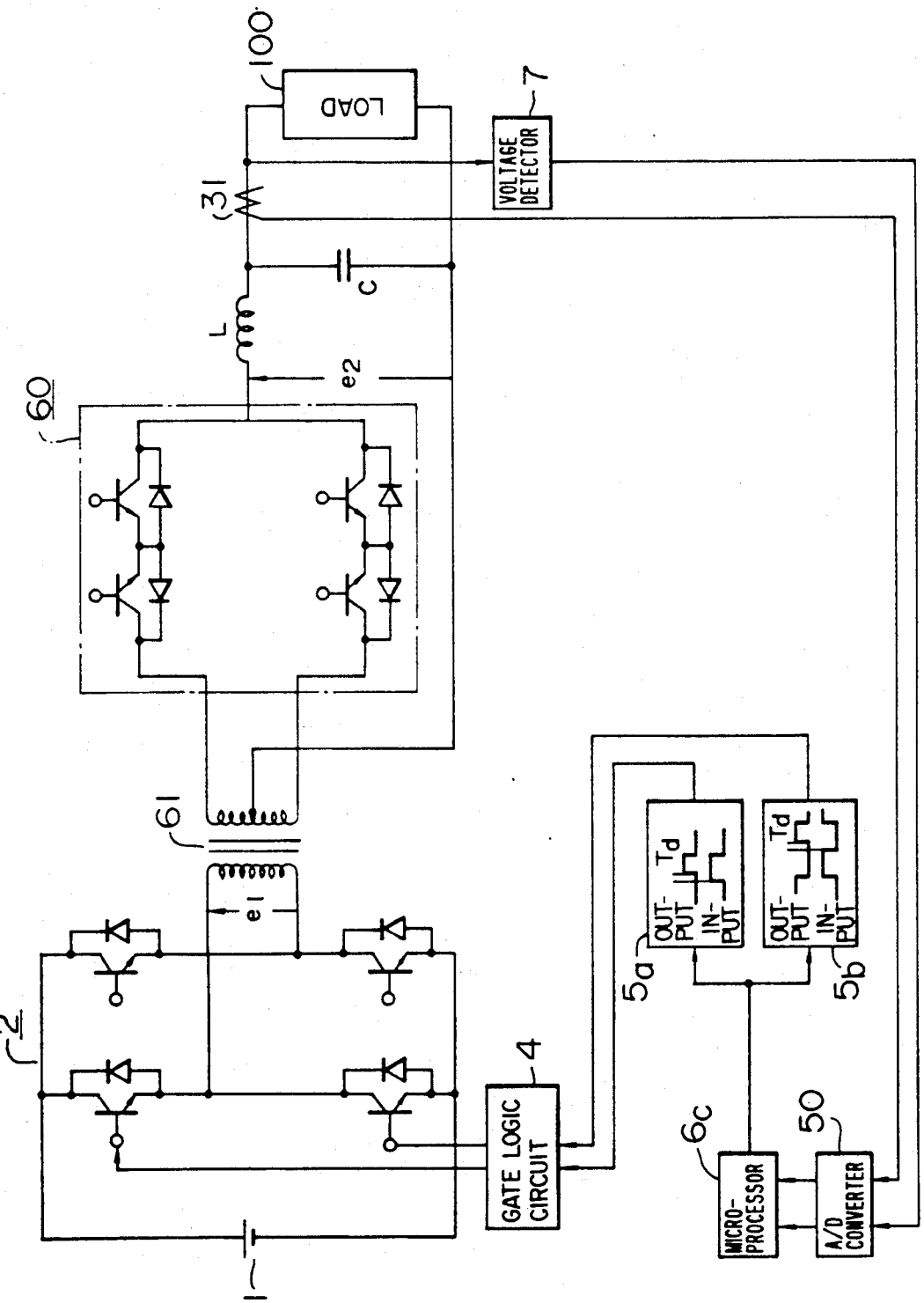
Figure 27:
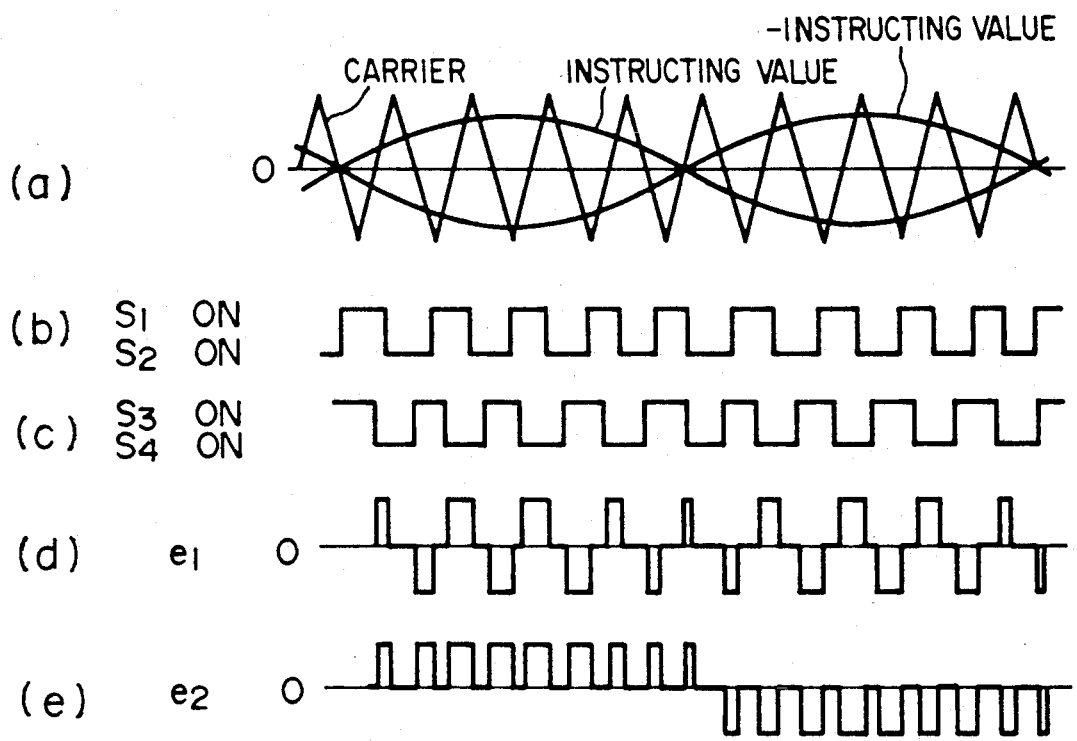
FIG. 27 shows waveform charts (a)-(e) used for explaining the operation of the seventh embodiment of the gain revision circuit.

FIG. 26 is a block diagram showing a construction of a seventh embodiment of a gain revision circuit, and FIGS. 27(a) through (e) are waveform charts for explaining the operation of the seventh embodiment. In FIG. 26, reference numeral 60 designates an insulating cycloconverter and 61 a transformer. Other reference numerals designate the same elements as those in FIG. 25. Also, in FIG. 27 a waveform (a) shows the carrier signal and the output voltage reference or instructing value, waveforms (b), (c) pulse width modulated signals, a waveform (d) an output voltage from the inverter, and a waveform (e) an output voltage from the cycloconverter 60.

This seventh embodiment has the inverter section of the sixth embodiment comprising the inverter 2, the cycloconverter 60 and the transformer 61 to form a high frequency link type inverter.

The basic operation of the high frequency link type inverter is performed as shown in FIGS. 27(a) through (e). Specifically, the seventh embodiment is adapted to convert a high frequency voltage $e_1$, which is a carrier frequency as it is output from the inverter 2, to a low frequency voltage $e_2$ by the cycloconverter 60 and apply the low frequency voltage $e_2$ to the load 100, which results in remarkably reducing the insulating transformer 61 in size when the gain revision circuit is implemented in an application which requires insulation.

Such high frequency link type inverter is also influenced by on-delay in a similar manner to ordinary inverters so that the present invention can be applied thereto. It is therefore possible, according to the seventh embodiment, to provide a small-size uninterruptible power supply presenting a reduced distortion in the output voltage waveform.

The above-mentioned first to seventh embodiments have been all explained with a single phase inverter, however, the present invention can be applied to three-phase or a multiphase inverters having more than three phases in precisely the same manner.

Figure 28:
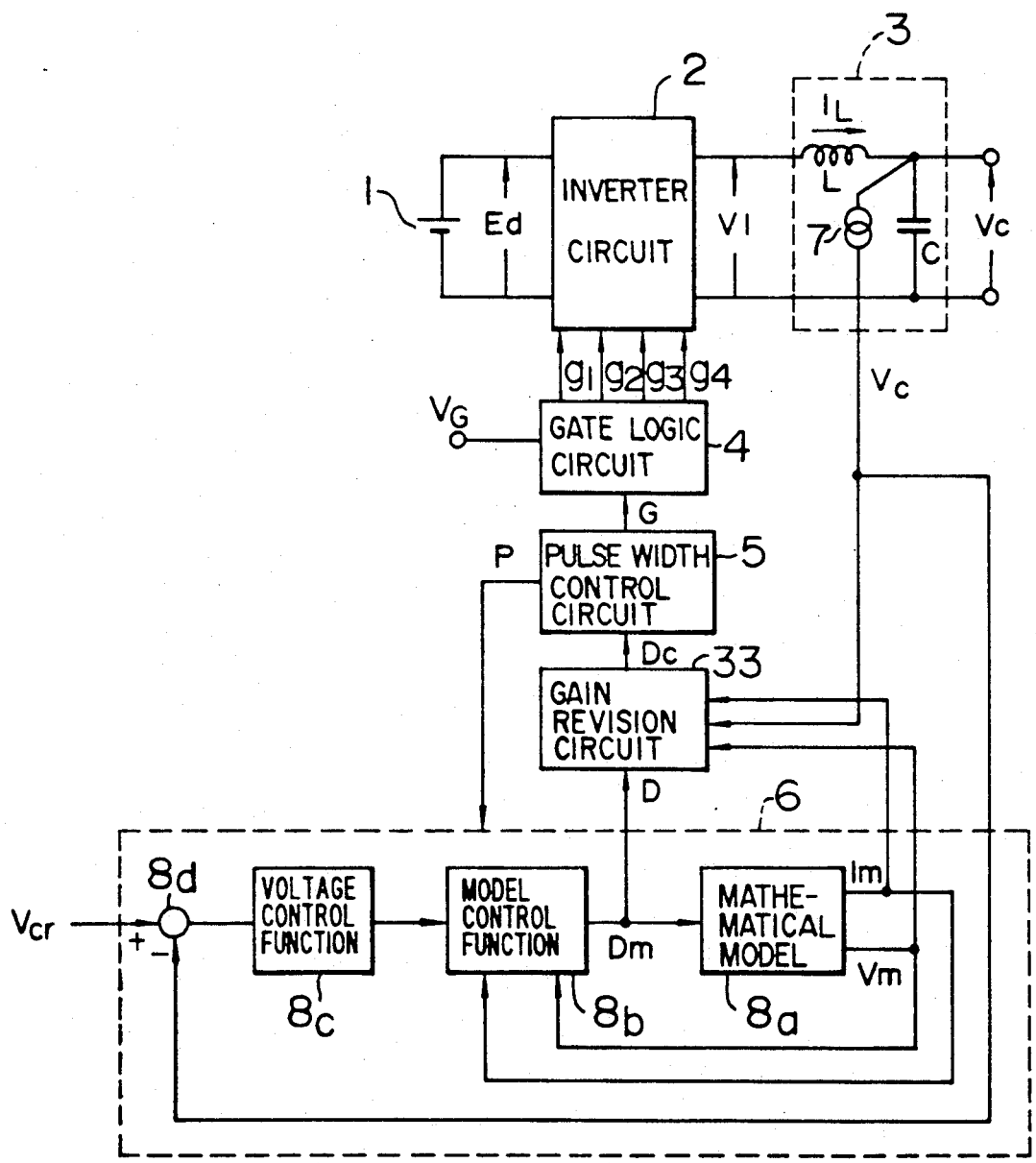
FIG. 28 is a block diagram illustrating a whole arrangement of a fifth embodiment of the present invention.

FIG. 28 is a block diagram of a circuit which employs a model current Im in place of the reactor current $I_L$ employed in the gain revision circuit 33 of FIG. 1. The model current Im corresponds to the reactor current $I_L$ so that the same effects as the embodiment shown in FIG. 18 can be produced. Also, in the embodiment of FIG. 18, the operation of the uninterruptible power supply may become unstable due to an influence of a ripple in the reactor current $I_L$, however, such unstable operation can be removed by the construction of FIG. 28 to accordingly stabilize the operation of the uninterruptible power supply.

Figure 29:
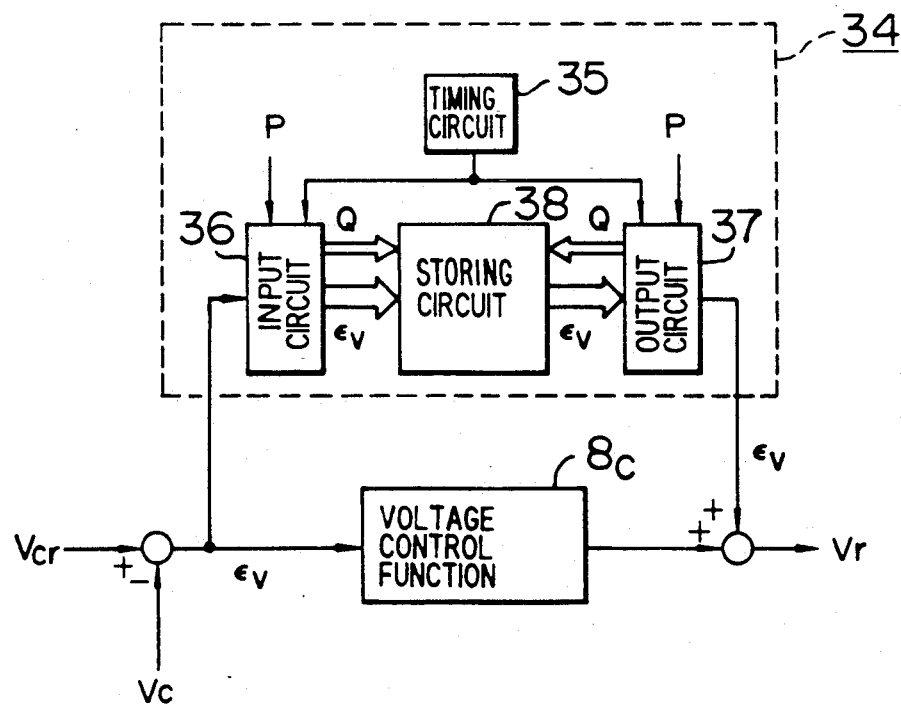
FIG. 29 is a block diagram illustrating an output voltage control function which is provided with a waveform storing circuit.

FIG. 29 shows a circuit arrangement in which waveform storing means 34 is arranged in parallel with the output voltage control function 8c. When the uninterruptible power supply is repeatedly operated according to a regular operation pattern, a deviation ev between the AC output voltage reference value Vcr and the output voltage Vc is stored in the waveform storing means 34. This deviation ev is added to the output from the output voltage control function 8c to generate the reference value Vr for a model control circuit so as to reduce an error in the current operation pattern by the use of the deviation ev derived in accordance with the previous operation pattern. The waveform storing means 34 comprises a timing circuit 35, an input circuit 36, an output circuit 37, and a storing circuit 38. The timing circuit 35 applies a signal indicative of a starting time of the operation pattern to the input circuit 36 and the output circuit 37. The input circuit 36 is started by the signal from the timing circuit 34 and stores the deviation ev in the storing circuit 38 while changing an address signal Q by means of a pulse P indicating a sampling time of the operating circuit 6. The output circuit 36 is started by the signal from the timing circuit 34, and fetches and outputs the deviation ev from the storing circuit 38 while changing the address signal Q by means of the pulse P indicating a sampling time of the operating circuit 6.

FIG. 30 shows a circuit arrangement which is provided with a limiter 43 in an integrating function 39 included in the output voltage control function 8c for preventing the integrating function 39 from being saturated, and another saturation preventing means 40 is parallel with the integrating function 39. The saturation preventing means 40 comprises DC component detecting means 41 for detecting a DC component in the output from the integrating function 39 and gain setting means 42. The output from the saturation preventing means 40 is subtracted from the input to the integrating function 39. Since the uninterruptible power supply is intended to generate an AC voltage, the output from the integrating function 39 is also an AC voltage. Therefore, if a DC component is included in the output from the integrating function 39, it is thought that the integrating function 39 tends to be saturated by influences such as an offset occurring in the output voltage detector 7 and the like. However, on such occasions, the saturation preventing means 40 is operated to previously prevent the integrating function 39 from being saturated, thereby making it possible to stably operate the uninterruptible power supply. In FIG. 30, a limiter 44 similar to the limiter 43 is disposed at the output terminal for preventing the output voltage from the uninterruptible power supply from becoming too large due to an excessively increased manipulating amount and accordingly preventing the uninterruptible power supply from being destroyed by an excessive voltage or excessive current.

Next, explanation will be given of a case where the present invention is applied to a three-phase electric power converting apparatus.

Figure 31:
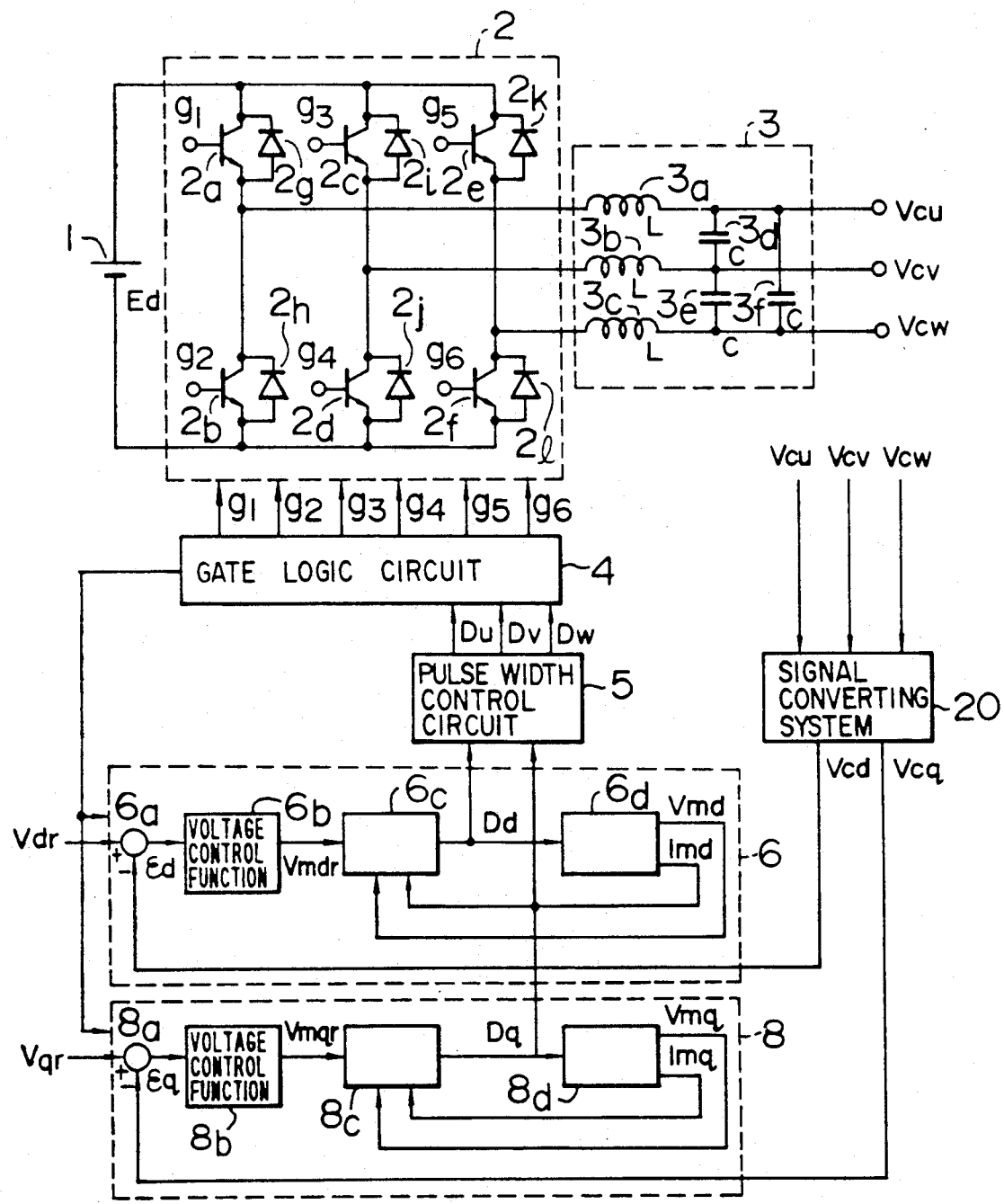
FIG. 31 is a block diagram illustrating a whole arrangement of a two-phase to three-phase electric power converting apparatus in which the present invention is implemented.

FIG. 31 is a block diagram showing a whole arrangement of a converting apparatus for converting a DC voltage to a three-phase AC voltage.

In FIG. 31, reference numeral 1 designates a DC power supply, 2 a three-phase inverter circuit, 3 an output filter, 4 a gate logic circuit, 5 a pulse width control circuit, 20 a three-phase to two-phase signal converting system, and 6, 8 processing circuits for generating a pulse width reference signal.

In the embodiment shown in FIG. 31, a main circuit section includes the DC power source 1 which serves as an electric power supply source which receives electric power from a commercial power supply or a storage battery, the three-phase inverter circuit 2 for inverting a DC voltage Ed from the DC power source 1 to a three-phase AC voltage, the output filter 3 for removing higher harmonic components of an output voltage from the three-phase inverter circuit 2 to generate smooth three-phase AC output voltages Vcu, Vcv and Vcw.

Also, a control circuit section comprises the three-phase to two-phase signal converting system 20 for converting the three-phase AC output voltages Vcu, Vcv and Vcw to two-phase AC voltage signals Vcd, Vcq, the processing circuits 6, 8 for generating two-phase pulse width reference signals Dd, Dq, respectively, for approximating the two-phase AC voltage signals Vcd, Vcq to two-phase AC voltage reference values Vdr, Vqr, the pulse width control circuit 5 for generating from the two-phase pulse width reference signals Dd, Dq three-phase pulse width reference signals Du, Dv and Dw which respectively correspond to each phase of the three-phase AC voltages, and the gate logic circuit 4 for generating gate pulses $g_1$, $g_2$, $g_3$, $g_4$, $g_5$ and $g_6$ for driving respective switching elements 2a, 2b, 2c, 2d, 2e and 2f arranged in the three-phase inverter circuit 2 in response to values of the three-phase pulse width reference signals Du, Dv and Dw.

Next, the operation of each component block of the present embodiment will be explained.

First, a signal conversion performed by the signal converting system 20 and the pulse width control circuit 5 will be explained.

Generally, the following formulae (6), (7) are employed as relationship formulae for converting three-phase AC voltage signals to two-phase AC voltage signals:

$$Vcd = (\tfrac{2}{3}) \cdot (Vcu - Vcv/2 - Vcw/2) \quad (6)$$

$$Vcq = (2/3) \cdot (\sqrt{3} \cdot Vcv/2 - \sqrt{3} \cdot Vcw/2) \quad (7)$$

In the above formulae (6), (7), Vcu, Vcv and Vcw represent three-phase AC output voltages in FIG. 31, and Vcd, Vcq represent two-phase AC voltage signals after conversion. Vcd, Vcq are named as a d-phase voltage and a q-phase voltage, respectively.

Also, as relationship formulae for converting the two-phase pulse width reference signals Dd, Dq to the three-phase pulse width reference signals Du, Dv and Dw, the following formulae (8), (9) and (10) are employed:

$$Du = Dd \quad (8)$$

$$Dv = -Dv/2 - 3 \cdot Dq/2 \quad (9)$$

$$Dw = -Dd/2 + 3 \cdot Dq/2 \quad (10)$$

The signal converting system 20 performs a signal conversion according to the formulae (6), (7), while the pulse width control circuit 5 performs a signal conversion according to the formulae (8), (9) and (10). Therefore, by employing the pulse width control circuit 5 and the signal converting system 20, control objects for the processing circuits 6, 8 are single-phase uninterruptible power supplies which equivalently correspond to the d-phase and the q-phase, respectively.

The operations of the processing circuits 6, 8 of the present embodiment for converting a DC voltage to three-phase AC voltage are the same as that of the previously explained single-phase inverter, so that explanation thereof will be omitted.

Figure 32:
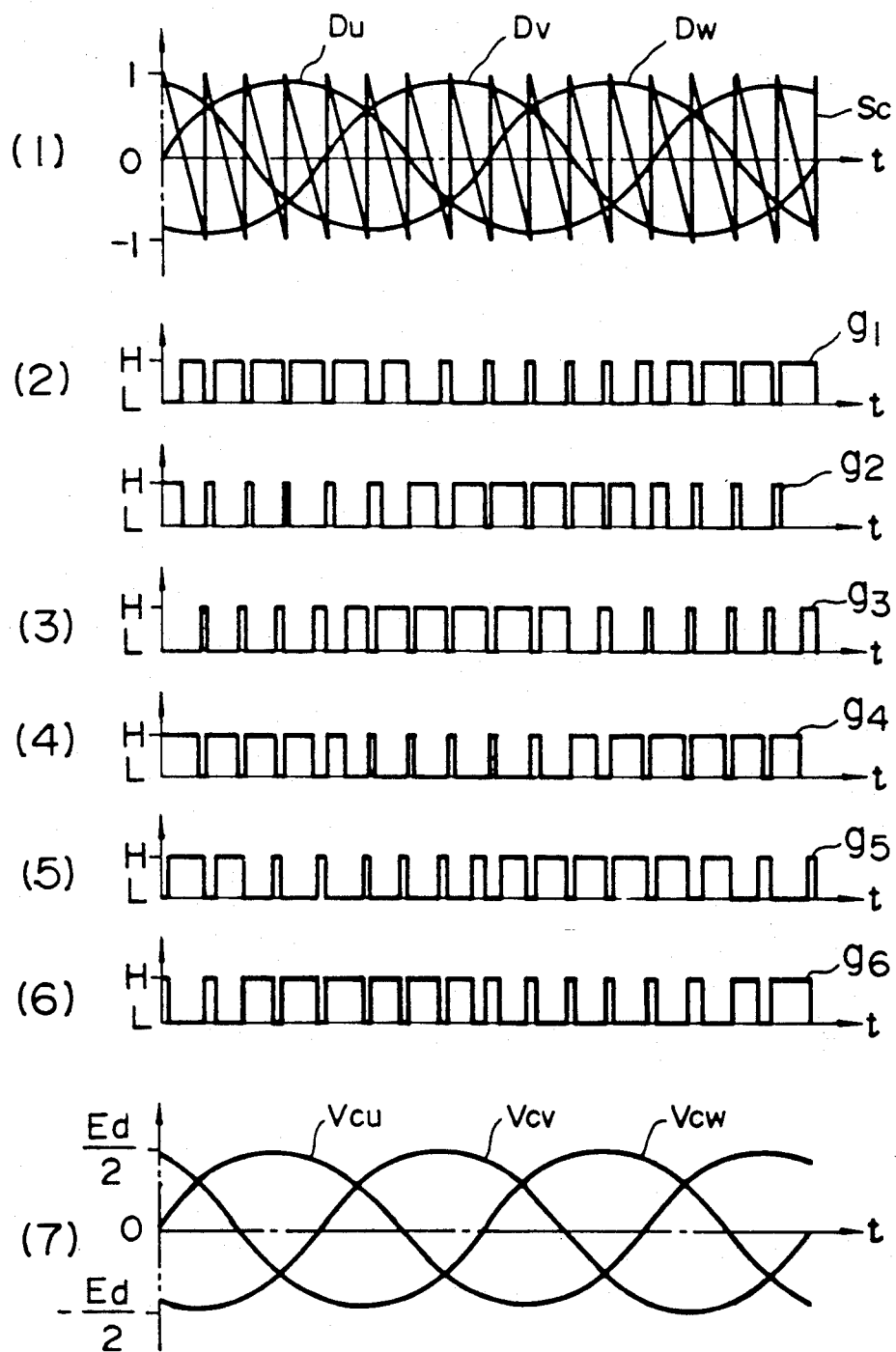
FIG. 32 shows waveform charts (1)-(7) used for explaining the operation of a three-phase pulse width controlling circuit.

FIG. 32(1) through (7) are waveform charts used for explaining the operation of the gate logic circuit 4. In FIG. 32(1), reference letter Sc designates a saw-toothed wave signal generated in the gate logic circuit 4.

The gate logic circuit 4 generates the gate pulses $g_1$, $g_2$, $g_3$, $g_4$, $g_5$ and $g_6$ for controlling switching elements constituting a three-phase inverter by comparing the signal Sc with the pulse width reference signals Du, Dv and Dw. By this operation, the three-phase AC output voltages Vcu, Vcv and Vcw as shown in FIG. 32(7) are delivered from the output filter 3.

The above-mentioned embodiment shown in FIG. 31 enables the output voltage Vcd (corresponding to Vc in FIG. 11) to stably respond to a reference value Vmdr (corresponding to Vr in FIG. 11) at a higher speed. Also, since the output voltage Vcd can stably respond to the reference value Vmdr at a higher speed, output voltage control functions $6b$, $8b$ are provided with high speed response characteristics.

Consequently, the present embodiment can control the output voltages Vcu, Vcv and Vcw to promptly and stably respond to the AC output voltage references Vdr, Vqr.

The present embodiment is constructed so as to convert three-phase output voltages from a power supply to two-phase voltages and utilize the converted two-phase voltages for a control operation, however, the present embodiment can be modified to utilize a load current for such control operation.

Figure 33:
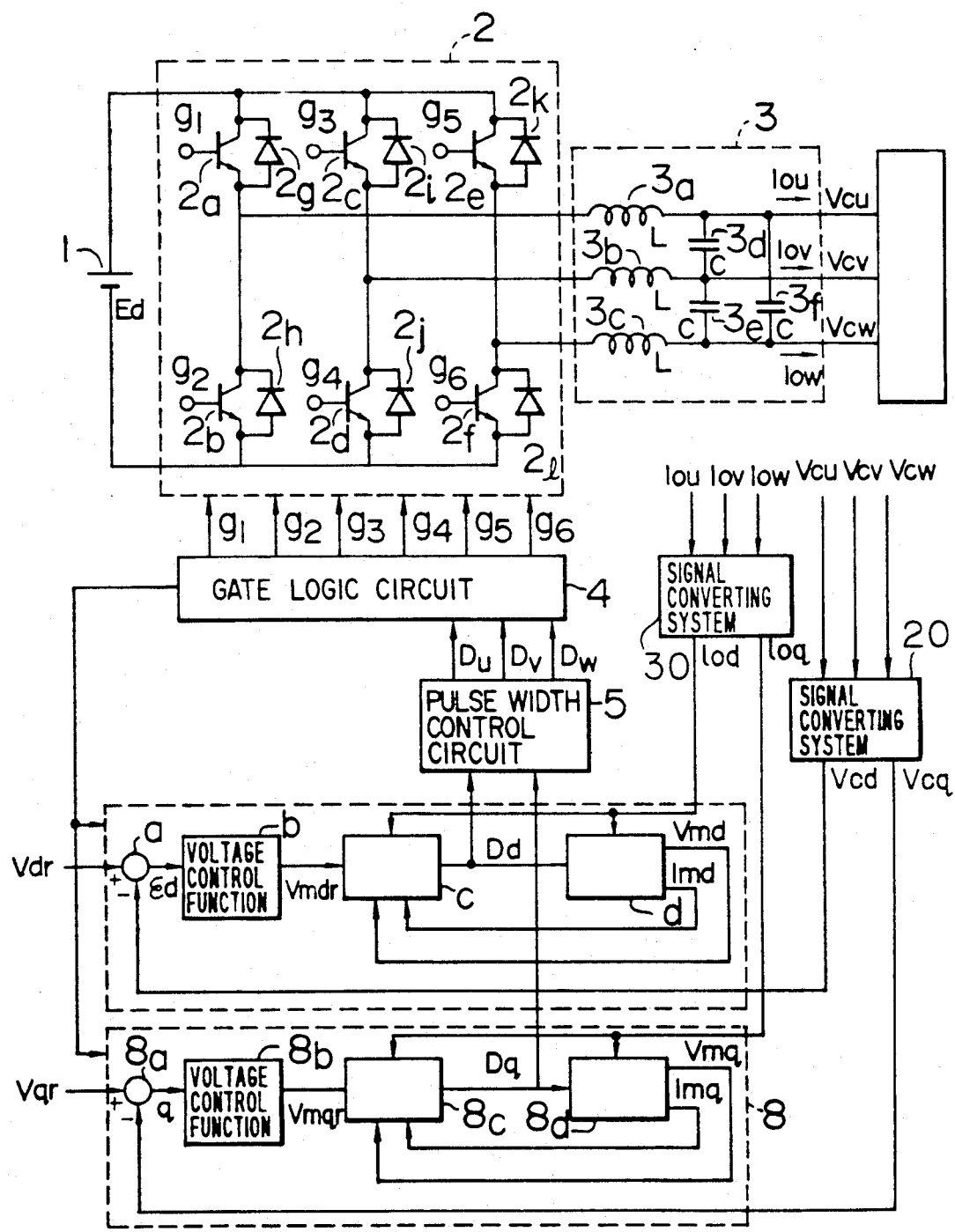
FIG. 33 is a block diagram illustrating another embodiment of a two-phase to three-phase electric power converting apparatus in which the present invention is implemented.

FIG. 33 is a block diagram showing a construction of a further embodiment of the present invention which is adapted to perform a control operation by the use of a load current.

The embodiment of FIG. 33 converts load currents Iou, Iov and Iow to two-phase currents Iod, Ioq by a three-phase to two-phase signal converting system 30 and utilizes the two-phase currents Iod, Ioq for a control operation.

As described above, the electric power converting apparatus of the present invention can avoid a delay due to a processing time of control and processing means and a delay due to response delay of a detecting circuit to thereby promptly and stably control an output voltage from an uninterruptible power supply and the like.

Also, the gain revision circuit of the present invention can reduce a voltage error in each pulse in a region where the polarity of an output current is reversed during a half period of a carrier and substantially suppress the total of voltage errors to zero in the region where the polarity of the output current is reversed during a half period of the carrier, thereby making it possible to generate an output voltage with remarkably reduced distortion in the output waveform caused by on-delay even in the case where a load generates a large ripple.

Further, the present invention can be applied to a three-phase to two-phase conversion without any modification, wherein three-phase AC output voltage waveforms can be controlled by a simple control system adapted to two-phase AC output voltages.

We claim:

1. A control circuit for an electric power supply apparatus adapted to convert electric power supplied from an electric power supply source to variable frequency and variable voltage AC electric power by a converter including a plurality of switching elements and to supply said converted electric power to a load, said control circuit comprising:
a detector for detecting an output voltage applied to said load;
a processing circuit for generating a pulse width reference value in response to a value detected by said detector and an output voltage reference value;
a pulse width control circuit for generating a gate reference signal by the use of said pulse width reference value; and
a gate logic control circuit for generating gate pulses for said plurality of switching elements in response to said gate reference signal.

2. A control circuit for an electric power supply apparatus according to claim 1, further comprising a gain revision circuit coupled between said processing circuit and said pulse width control circuit for performing an on-delay compensation of said gate reference signal.

3. A control circuit for an electric power supply apparatus according to claim 1, wherein said processing circuit includes:
a model for simulating a dynamic characteristic of said electric power supply apparatus;
model control means for controlling an output variable of said model in a closed loop fashion; and
electric power supply apparatus control means for providing said model control means with a control instruction for approximating and output variable of said electric power supply apparatus to an output variable reference value, wherein an output value of said model control means is output as said pulse width reference value.

4. A method of controlling an electric power supply apparatus to approximate to an output variable reference value an output variable of the electric power supply apparatus such as an output voltage, an output current, and an output electric power, the electric power supply apparatus being for converting electric power supplied from an electric power supply source and for supplying a load with the converted electric power, comprising the steps of:
representing a dynamic characteristic of the electric power supply apparatus with a mathematical model;
controlling in a closed loop fashion an output variable of said mathematical model which corresponds to the output variable of said electric power supply apparatus in accordance with a model control function; and
approximating the output variable of said electric power supply apparatus to the output variable reference value in accordance with an electric power supply apparatus control function;
wherein an output value of said model control function is used as a manipulating variable for said mathematical model and as a manipulating variable for the electric power supply apparatus, and an output value of said electric power supply apparatus control function is used as an model control function reference value for said model control function.

5. A control method for an electric power supply apparatus according to claim 4, wherein said manipulating variable supplied from said model control function to said electric power supply apparatus is a pulse width reference value for gate pulses applied to a plurality of switching elements included in said electric power supply apparatus.

6. A control method for an electric power supply apparatus according to claim 4, wherein said model control function reference value for said model control function is a sum of the output value of said electric power supply apparatus control function and an electric power supply apparatus reference value for said electric power supply apparatus.

7. A control method for an electric power supply apparatus according to claim 4, further comprising the step of detecting an operating condition of said electric power supply apparatus and correcting an operating condition of one of said model and said model control function based on a result of said detecting step.

8. A control method for an electric power supply apparatus according to claim 4, wherein one of said model control function and said electric power supply apparatus control function is provided with a learning function to improve a control performance thereof.

9. A control method for an electric power supply apparatus according to claim 4, wherein one of said model control function and said electric power supply apparatus control function is provided with the limiter function for suppressing at least one of an excessive voltage and an excessive current output from said electric power supply apparatus.

10. A control method for an electric power supply apparatus according to claim 4, wherein one of said model control function and said electric power supply apparatus control function is provided with a correcting function for correcting an error in a control variable for the electric power supply apparatus detected by a detector.

11. A control method for an electric power supply apparatus according to claim 7, wherein a current detected value indicative of the operating condition is corrected by at least one previously detected value indicative of the operating condition to improve accuracy in detecting the operating condition of said electric power supply apparatus.

12. An uninterruptible power supply comprising:
a converter circuit for converting AC electric power supplied from a commercial electric power source to DC electric power;
a storage battery for supplying DC electric power in place of said DC electric power from said converter circuit when said commercial electric power source is interrupted;
an inverter circuit including a plurality of switching elements for inverting said DC electric power from one of said converter circuit and said storage battery to variable frequency and variable voltage AC electric power; and
a filter circuit for removing higher harmonic components from an output of said inverter circuit;
wherein a control circuit for on-off controlling said switching elements of said inverter circuit includes a gate logic circuit for generating gate pulses, a pulse width control circuit for supplying said gate logic circuit with a gate signal, and a processing circuit, said processing circuit including a model for simulating a dynamic characteristic of said inverter circuit, model control means for controlling an output variable of said model in a closed loop fashion, and electric power supply apparatus control means for approximating an output variable of said inverter circuit to an output variable reference value, wherein an output value of said model control means is used as a pulse width reference value for said pulse width control circuit, and an output value of said electric power supply apparatus control means is used as a model control means reference value for said model control means.

13. An electric power supply apparatus for converting electric power from an electric power supply source to three-phase AC electric power through a three-phase electric power converter including a plurality of switching elements, said electric power supply apparatus comprising:
converting means for converting detected values of three-phase AC output voltages of the three-phase electric power converter to equivalent two-phase AC voltage signals;
two mathematical models for respectively simulating a dynamic characteristic of the electric power supply apparatus for the two-phase AC voltage signals;
two model control functions for respectively controlling two output variables of said two mathematical models corresponding to said two-phase AC voltage signals in a closed loop fashion; and
two electric power supply apparatus control functions for respectively manipulating two reference values for the two model control functions;
wherein two output values of said two model control functions are respectively used as two manipulating variables for the two mathematical models, and three pulse width reference values for the three-phase electric power converter are generated from the two manipulating variables.

14. A control method for an electric power supply apparatus for converting electric power from an electric power supply source to three-phase AC electric power with a three-phase electric power converter including a plurality of switching elements and for supplying the three-phase AC electric power to a load through a filter circuit, comprising the steps of:
converting detected values of three-phase AC output voltages of the three-phase electric power converter to equivalent two-phase AC voltage signals;
respectively simulating a dynamic characteristic of the electric power supply apparatus for the two-phase AC voltage signals in accordance with two mathematical models;
respectively controlling two output variables of said two mathematical models corresponding to said two-phase AC voltage signals in a closed loop fashion in accordance with two model control functions; and
respectively manipulating two reference values for the two model control functions in accordance with two electric power supply apparatus control functions;
wherein two output values of said two model control functions are respectively used as two manipulating variables for the two mathematical models, and three pulse width reference values for said three-phase electric power converter are generated from the two manipulating variables.

15. A control circuit for an electric power supply apparatus for outputting a pulse width modulated voltage in response to an output voltage reference value and for supplying the pulse width modulated voltage to a load. the control circuit comprising:
 a current detector for detecting an instantaneous value of a basic wave component of an output current of the electric power supply apparatus: and
 pulse width correcting means for correcting a pulse width of the pulse width modulated voltage based on the instantaneous value of the basic wave component of the output current.

16. A control circuit for an electric power supply apparatus according to claim 15. wherein said pulse width correcting means generates a correction value for the pulse width in proportion to the instantaneous value of the basic wave component of the output current within an upper limit value and a lower limit value of the correction value.

17. A control circuit for an electric power supply apparatus according to claim 16. further comprising means for simulating the load. wherein said current detector detects the instantaneous value of the basic wave component of the output current from said simulating means.

18. A control circuit for an electric power supply apparatus for outputting a pulse width modulated voltage in response to an output voltage reference value and for supplying the pulse width modulated voltage to a load. the control circuit comprising:
 a current detector for detecting an instantaneous value of a basic wave component of an output current of the electric power supply apparatus: and
 means for correcting said output voltage reference value based on the instantaneous value of the basic wave component of the output current.

19. A control circuit for an electric power supply apparatus according to claim 18. wherein said means for correcting said output voltage reference value generates a correction value for the output voltage reference value in proportion to the instantaneous value of the basic wave component of the output current within an upper limit value and a lower limit value of the correction variable.

20. A control circuit for an electric power supply apparatus according to claim 19. further comprising means for simulating the load. wherein said current detector detects the instantaneous value of the basic wave component of the output current from said simulating means.

* * * * *